US011464042B2

(12) United States Patent
Furuskog et al.

(10) Patent No.: US 11,464,042 B2
(45) Date of Patent: Oct. 4, 2022

(54) RANDOM-ACCESS RESPONSE WITH ANALOG BEAMFORMING

(71) Applicant: TELEFONAKTIEBOLAGET LM ERICSSON (PUBL), Stockholm (SE)

(72) Inventors: Johan Furuskog, Stockholm (SE); Henrik Sahlin, Mölnlycke (SE); Andreas Bergström, Vikingstad (SE); Håkan Andersson, Linköping (SE); Niclas Wiberg, Linköping (SE); Qiang Zhang, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 16/950,501

(22) Filed: Nov. 17, 2020

(65) Prior Publication Data

US 2021/0068145 A1    Mar. 4, 2021

Related U.S. Application Data

(63) Continuation of application No. 15/935,251, filed on Mar. 26, 2018, now Pat. No. 10,849,154, which is a
(Continued)

(51) Int. Cl.
*H04W 72/14*   (2009.01)
*H04W 72/12*   (2009.01)
(Continued)

(52) U.S. Cl.
CPC .......... *H04W 72/14* (2013.01); *H04W 16/28* (2013.01); *H04W 72/1268* (2013.01); *H04W 72/1294* (2013.01); *H04W 74/0833* (2013.01)

(58) Field of Classification Search
None
See application file for complete search history.

(56) References Cited

U.S. PATENT DOCUMENTS 9,603,165 B2 * 3/2017 Furuskog .......... H04W 74/0833
2011/0268049 A1   11/2011 Luo et al.
(Continued)

FOREIGN PATENT DOCUMENTS

CN    103999531 A    8/2014
CN    103002526 B    6/2015
(Continued)

OTHER PUBLICATIONS

3GPP TS 36.211 V11.6.0; 3rd Generation Partnership Project; Technical Specification Group Radio Access Network; Evolved Univ.ersal Terrestrial Radio Access (E-UTRA); Physical Channels and Modulation (Release 11); Sep. 2014.
(Continued)

*Primary Examiner* — Brian S Roberts

(57) ABSTRACT

A system and method of Random-Access Response, RAR, messaging when a base station employs narrow beamforming. Multiple RAR messages are successively transmitted from the base station to a User Equipment, UE, before any response to a RAR message is received from the UE. Thus, despite any calibration mismatch between Uplink, UL, and Downlink, DL, beams in the beamformed system, a RAR message is not only received by the UE, but is received over the most-suitable DL beam for that UE. Each RAR message may contain a message-specific scheduling-delay indicator in the UL grant carried in the RAR message to provide an adjustable time delay for the UE's uplink transmission scheduled by the UL grant. Multiple RAR transmissions can schedule a single UL transmission at a specific time instance or different UL transmissions at different time intervals. The UE may report to the base station the best DL RAR transmission detected by the UE.

5 Claims, 8 Drawing Sheets

Related U.S. Application Data continuation of application No. 15/427,330, filed on Feb. 8, 2017, now Pat. No. 9,930,691, which is a continuation of application No. 14/755,895, filed on Jun. 30, 2015, now Pat. No. 9,603,165.

(60) Provisional application No. 62/109,897, filed on Jan. 30, 2015.

(51) Int. Cl.
*H04W 74/08* (2009.01)
*H04W 16/28* (2009.01)

(56) References Cited

U.S. PATENT DOCUMENTS

| | | |
|---|---|---|
| 2012/0147830 A1 | 6/2012 | Löhr |
| 2012/0320842 A1 | 12/2012 | Jeong |
| 2013/0021979 A1 | 1/2013 | Kwon et al. |
| 2013/0034059 A1 | 2/2013 | Lee et al. |
| 2013/0301567 A1 | 11/2013 | Jeong et al. |
| 2014/0010178 A1 | 1/2014 | Yu et al. |
| 2014/0050157 A1 | 2/2014 | Korhonen et al. |
| 2014/0254515 A1 | 9/2014 | Kim |
| 2014/0328277 A1 | 11/2014 | Xiao |
| 2015/0016312 A1 | 1/2015 | Li |
| 2016/0227575 A1 | 8/2016 | Furuskog |

FOREIGN PATENT DOCUMENTS

| | | |
|---|---|---|
| CN | 102124774 B | 11/2015 |
| CN | 104247303 B | 6/2019 |
| EP | 3251454 B1 | 10/2019 |
| JP | 2012500592 A | 1/2012 |
| JP | 2012530434 A | 11/2012 |
| RU | 2477587 C2 | 3/2013 |
| WO | 2009038300 A1 | 3/2009 |
| WO | 2010077004 A2 | 7/2010 |
| WO | 2013158511 A1 | 10/2013 |
| WO | 2013166591 A1 | 11/2013 |
| WO | 2014007546 A1 | 1/2014 |
| WO | 2014139174 A1 | 9/2014 |
| WO | 2014161176 A1 | 10/2014 |
| WO | 2016120761 A1 | 8/2016 |

OTHER PUBLICATIONS

3GPP TS 36.212; 3rd Generation Partnership Project; Technical Specification Group Radio Access Network; Evolved Universal Terrestrial Radio Access (E-UTRA); Multiplexing and channel coding (Release 11); Sep. 2014.

3GPP TS 36.213; 3rd Generation Partnership Project; Technical Specification Group Radio Access Network; Evolved Universal Terrestrial Radio Access (E-UTRA); Physical layer procedures (Release 11); Dec. 2014.

* cited by examiner

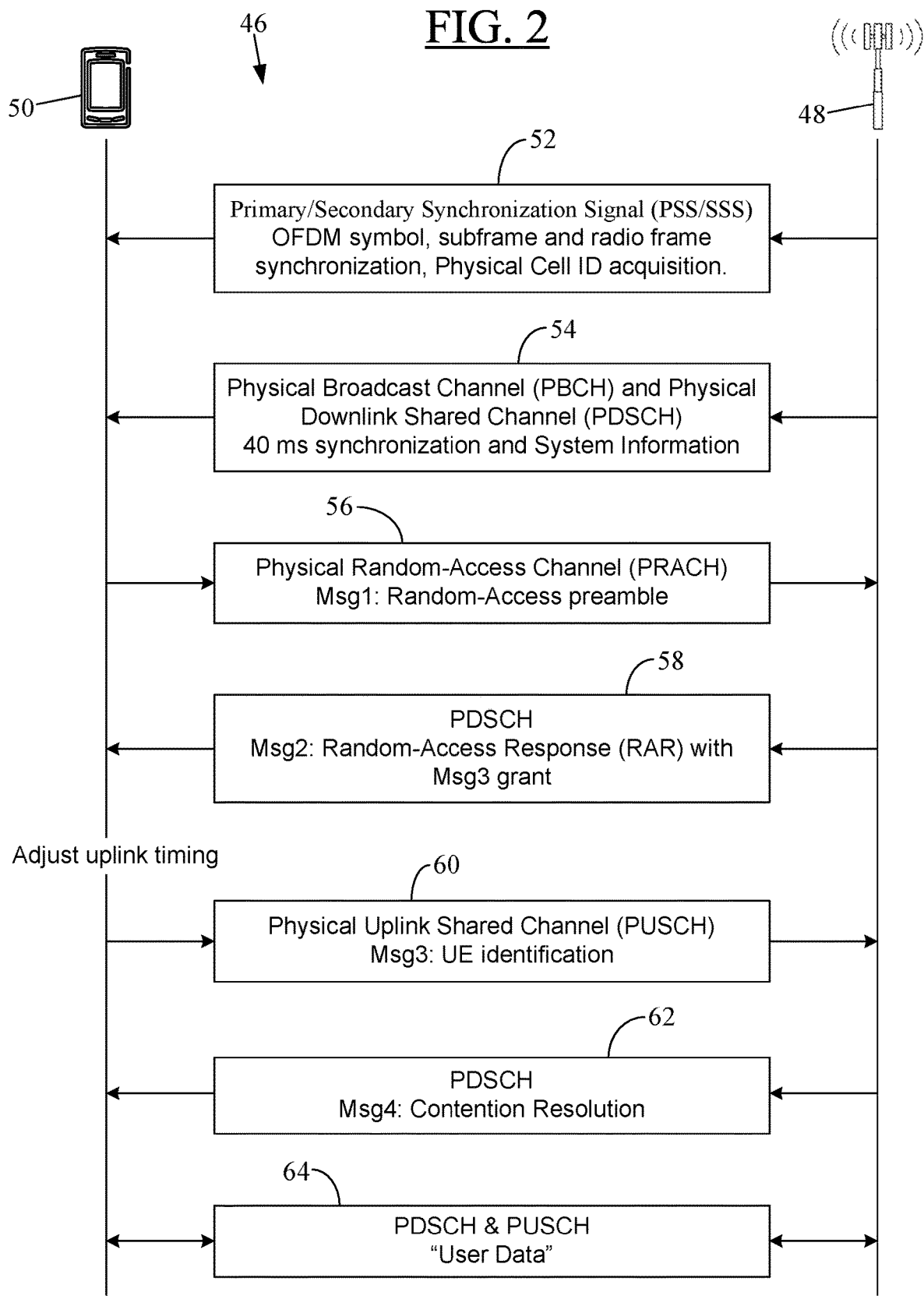

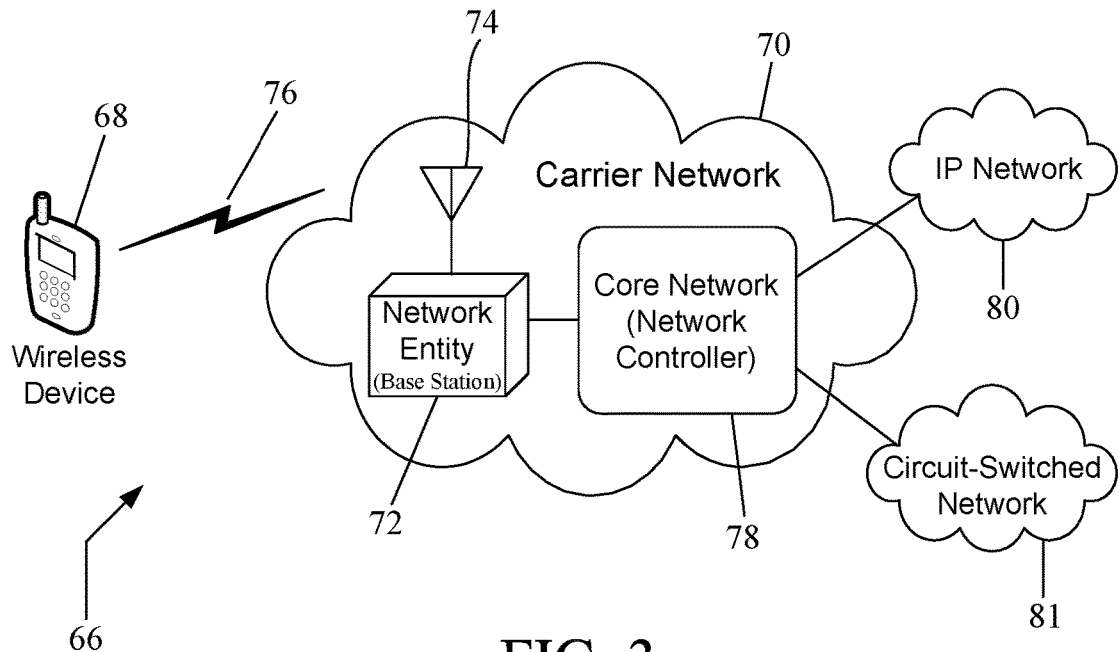

FIG. 3

A network entity generates a plurality of RAR messages. Each RAR message carries a respective UL grant for the UE to enable the UE to respond to the RAR message. — 85

For each RAR message, the network entity provides an RAR message-specific time delay indicator in the respective UL grant carried by the RAR message. — 86

The network entity configures each RAR message-specific time-delay indicator to provide to the UE an indication of a time interval in which the UE is scheduled to transmit in the UL to respond to a respective RAR message. — 87

The network entity successively transmits the plurality of RAR messages to UE before any response from the UE is received by the network entity in the UL. — 88

FIG. 4A

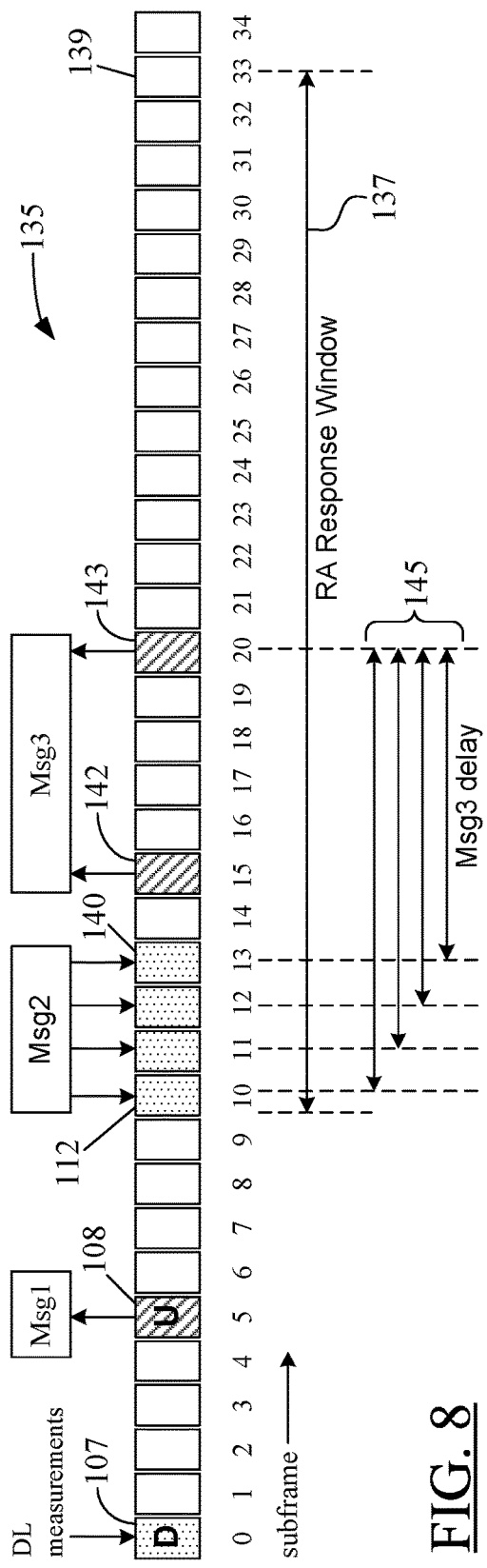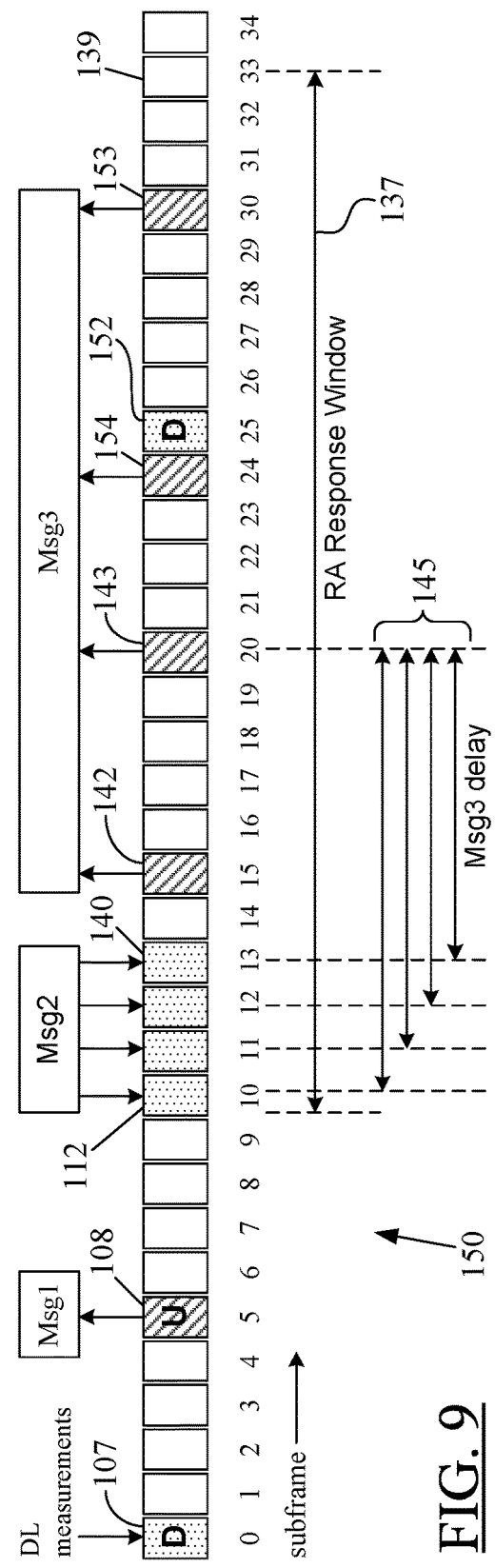

RANDOM-ACCESS RESPONSE WITH ANALOG BEAMFORMING

TECHNICAL FIELD

The present disclosure relates to a random-access procedure in a mobile communication system. More particularly, and not by way of limitation, particular embodiments of the present disclosure are directed to an apparatus and method of successively transmitting multiple Random-Access Response (RAR) messages from a network entity to a User Equipment (UE) when the network entity employs narrow beamforming, wherein each RAR message contains a scheduling-delay indicator in an Uplink (UL) grant carried in the RAR message so as to provide an adjustable time delay for the UE's uplink transmission scheduled by the UL grant.

BACKGROUND

In a traditional cellular telecommunications system, the coverage of a cell is defined by the geographical area where Radio Frequency (RF) signals transmitted from a base station to a UE, and vice versa, can be successfully received and decoded. The "RF signals" may be more simply referred to herein as "radio signals." The base station may be equipped with an antenna or antenna array that transmits and receives radio signals according to an antenna beam pattern that typically spans a quite large angle in azimuth and/or elevation. The wider the angle is, the lower the antenna gain becomes. Hence, there is a tradeoff between angular coverage and coverage range for a given antenna pattern. In order to have a large angular coverage in combination with high antenna gain, a steerable antenna array can be used to form and steer beams in desirable directions.

In the coverage-related discussion herein, a "cell" and its associated base station such as, for example, an evolved Node B (eNB or eNodeB), or a base station and its antenna array, may be referred to in an interchangeable manner and identified using the same reference numeral for ease of discussion. For example, a UE may be interchangeably referred to as receiving radio signals from a cell or an eNB, or the UE may be interchangeably referred to as receiving signals from a base station or the base station's antenna array.

FIGS. 1A-1E illustrate different examples of antenna beam patterns and their coverage range. In FIG. 1A, a base station antenna array 20 is shown providing an antenna beam pattern 26. Three UEs 22-24 are also shown in FIG. 1A as being physically present and operating (or registered) within the cell (not shown) associated with the base station 20. For the sake of discussion herein, the UEs 22-24 may be considered "attached" to or under the operative control of the base station 20. As shown in FIG. 1A, the antenna pattern 26 covers a wide angle with a limited range in the sense that only two of the three UEs—here UEs 22 and 24—receive radio coverage from the wide angle beam pattern 26. On the other hand, in FIG. 1B, the antenna array 20 is shown to provide another beam pattern 28. For ease of discussion, the same reference numerals are used in FIGS. 1A-1D to refer to the same entities. However, it is understood that, in practice, all of the beam patterns shown in FIGS. 1A-1D may not be necessarily provided by the same base station antenna; different base stations may provide different types of antenna patterns. Referring again to FIG. 1B, it is observed that although the antenna pattern 28 provides a greater range—which now provides radio coverage to the UE 23, the beam pattern 28 covers a narrower angle than the beam pattern 26. As a result, the UEs 22 and 24 may fall outside of the coverage area.

To provide coverage to all UEs 22-24, the antenna array 20 may be configured as a steerable antenna array as shown in FIG. 1C. The steerable antenna array 20 can provide individual antenna beams 30-32, which may be provided simultaneously or scanned through in time domain (as discussed later with reference to FIG. 1D). The multiple beams 30-32 resulting from the steerable antenna array 20 may not only effectively cover the wide angle of FIG. 1A, but also provide the range of FIG. 1B, thereby providing radio coverage to all three UEs 22-24 as shown.

The base stations in modern cellular systems may also employ beamforming in addition to the beam steering illustrated in FIG. 1C. Beamforming or spatial filtering is a signal-processing technique used in antenna arrays for directional signal transmission or reception. It is understood that digital content may be transmitted using analog radio signals. In beam-forming, the analog radio signals may be processed/shaped such that signals at particular angles experience constructive interference, while others experience destructive interference. Such analog beamforming can be used at both the transmitting and receiving ends to achieve spatial selectivity, such as, for example, rejection of unwanted signals from specific directions. The spatial selectivity may provide improved reception/transmission of signals in the system. Thus, beamforming can help improve wireless bandwidth utilization, and it can also increase a wireless network's range. This, in turn, can improve video streaming, voice quality, and other bandwidth- and latency-sensitive transmissions.

For a beam-forming system that only supports a set of fixed beams, all signals may be beamformed although the desired direction of transmission may be unknown or only known to some extent. Furthermore, some beamforming systems, such as, for example, analog beamforming systems, can only transmit in one or a few beams simultaneously. In such systems, multiple beams may have to be scanned through in time domain to provide coverage to all the UEs attached to the base station. Thus, as illustrated in FIG. 1D, only one antenna beam 34-36 can be transmitted at a time, for example, due to an analog beamforming implementation. As a result, different beams 34-36 and corresponding addressed UEs 22-24 may be time-multiplexed using time intervals at times t=0, t=1, and t=2, as shown. The antenna beams 34-36 may be beamformed, but may be steered in a manner similar to the beams 30-32 in FIG. 1C to provide the coverage range necessary to cover all the UEs 22-24 attached to the base station 20.

It is noted that, for ease of discussion, the terms "analog beamforming," "beamforming," "narrow beamforming," and other terms of similar import may be used interchangeably herein.

Beamforming systems may also have a calibration mismatch between the transmit (Tx) and receive (Rx) sides of an antenna array. On the other hand, some beamforming systems may even have separate antenna arrays for transmission and reception, such that beamforming-related directional information regarding a beam received in the Uplink (UL) may not be applied to a beam transmitting in the Downlink (DL). It is noted here that the terms Uplink and Downlink are used in their conventional sense: a transmission in the UL refers to a UE's transmission to a base station, whereas a transmission in the DL refers to a base station's transmission to a UE. In the context of beam-forming, FIG. 1E shows an example where two separate antenna arrays—a Tx array 38 and an Rx array 40—may form part of a base station's antenna system. It is seen from the illustration in FIG. 1E that the most suitable DL beam 42 for a UE 43 is different from the corresponding UL beam 44 due to separate Tx and Rx arrays at the base station. The DL beam 42 may be "most suitable" or "good enough" for the UE 43 in the sense that the beam 42 may allow the base station to establish and maintain transmissions to the UE 43. On the other hand, the UL beam 44 may be "most suitable" or "good enough" in the sense that the beam 44 may allow the base station to receive transmissions from the UE 43. However, in contrast to the configurations in FIGS. 1A-1D, the configuration in FIG. 1E uses two different beams 42, 44—one for the DL and the other for the UL, respectively.

In the time-multiplexed beam-forming implementation of FIG. 1D or the "mismatched" beams of FIG. 1E, a corresponding UE may have to first "attach" to the cell or base station before the UE can transmit/receive user data to/from the base station. Before a UE can "attach" to a cell, the UE may need to acquire system information of the corresponding cell when the UE tries to initially access the cell. In a Third Generation Partnership Project's (3GPP) Long-Term Evolution (LTE) cellular network, a random-access procedure is a key function that may need to be carried out to enable a UE to attach to the respective cell—regardless of whether the UE is attaching to the cell in a synchronized or non-synchronized mode.

FIG. 2 depicts an exemplary messaging flow 46 for a random-access procedure in a Fourth Generation (4G) LTE cellular network. For ease of discussion, the messaging flow 46 is shown with reference to an eNB 48 and a UE 50. The UE 50 may be similar to any of the UEs 22-24 and 43 in FIGS. 1A-1E. Similarly, the eNB 48 may be similar to the base station 20 in FIGS. 1A-1D or may constitute the antenna arrays 38, 40 of FIG. 1E. As noted before, for ease of discussion, the reference numeral "48" may be interchangeably used herein to refer to the eNB 48 or its corresponding cell (not shown). Cell search is part of the random-access procedure by which a UE may acquire time and frequency synchronization with a cell—more particularly, with a specific base station in the cell—and may detect the physical layer Cell ID of that cell. As shown at block 52 in FIG. 2, the eNB 48 may broadcast two special signals—a Primary Synchronization Sequence (PSS) and a Secondary Synchronization Sequence (SSS)—in an Orthogonal Frequency-Division Multiplex (OFDM) symbol. These broadcast signals may be received by all UEs operating in the cell 48, including the UE 50. The detection of these signals allows the UE 50 to perform time and frequency synchronization—indicated in block 52 as "subframe and radio frame synchronization"—with the eNB 48 and to acquire useful system parameters such as cell identity (physical cell ID). In LTE, the PSS and SSS synchronization signals may be transmitted twice per 10 ms radio frame. As is known, a 10 ms radio frame in LTE constitutes ten (10) "subframes" of 1 ms each. Thus, in LTE, a Transmission Time Interval (TTI) of 1 ms is referred to as a "subframe." The PSS signal may be the same for any given cell in every subframe in which it is transmitted.

As shown at block 54 in FIG. 2, the eNB 48 may also transmit Physical Broadcast Channel (PBCH) and Physical Downlink Shared Channel (PDSCH) signals in the corresponding cell. The PBCH may provide such basic information as the downlink system bandwidth, which may be essential for the initial access of the cell. However, the PBCH is designed to be detectable without prior knowledge of system bandwidth and to be accessible at the cell edge as well. Through the PBCH, the UE 50 may be requested to also receive the PDSCH to obtain important System Information (SI). The time interval between successive transmissions of the PBCH may be 40 ms. The PDSCH is the main data-bearing channel, which is allocated to users/UEs in the cell on a dynamic and opportunistic basis. In addition to sending user data to a UE, the PDSCH is also used to transmit general scheduling information and other broadcast information not transmitted on the PBCH such as, for example, the SI including System Information Blocks (SIBs). In LTE, SIBs may be scheduled by Physical Downlink Control Channel (PDCCH). This general scheduling information may not be UE-specific. However, any UE-specific scheduling information such as, for example, how to decode the SIBs, may be transmitted by the eNB 48 on an Enhanced PDCCH (ePDCCH) after random access is completed.

Upon receiving the synchronization signals at block 52 and the system information at block 54, the UE 50 may attempt to access the network and initiate the random-access procedure by transmitting a random-access preamble in the uplink on a Physical Random-Access Channel (PRACH), as indicated at block 56. The preamble allows the eNB 48 to estimate the timing-advance necessary for the UE 50. This timing advance is then communicated to the UE 50 a Random-Access Response (RAR) message at block 58 (discussed below). Only after receiving the RAR can the UE 50 synchronize its timing with the eNB 48 so as to "attach" to the eNB 48 or "camp" on the cell. The UE's 50 messaging at block 56 may be referred to herein as "Message1" or "Msg1." Upon receiving the preamble and detecting the UE's random-access attempt, the base station 48 may respond in the downlink by transmitting an RAR message on the PDSCH, as indicated at block 58. In the discussion herein, the terms "RAR message" and "Message2" (or "Msg2") may be interchangeably used to refer to the eNB's 48 response to the preamble-carrying Msg1 at block 56 during the random-access procedure. The random-access response at block 58 may be referred to in the relevant literature as a "RAR grant", which may be a 20-bit uplink scheduling grant for the UE 50 to continue the random-access procedure by transmitting a subsequent message—referred to herein as "Message3" or "Msg3"—in the uplink. The content of the RAR grant is defined in section 6.2 of the 3GPP Technical Specification (TS) 36.213, version 12.5.0 (March 2015), titled "3rd Generation Partnership Project; Technical Specification Group Radio Access Network; Evolved Universal Terrestrial Radio Access (E-UTRA); Physical Layer Procedures (Release 12)." The discussion in the section 6.2 of the 3GPP TS 36.213 is incorporated herein by reference in its entirety.

After adjusting its uplink timing, if necessary, based on the UL grant in Msg2, the UE 50 may transmit the Msg3 to the eNB 48 on a Physical Uplink Shared Channel (PUSCH) and provide its terminal identification (terminal ID) in Msg3, as indicated at block 60. Like the PDSCH, the PUSCH also carries user data. Furthermore, the UEs may be scheduled on the PUSCH and PDSCH in 1 ms scheduling interval—that is, in a time interval equal to a subframe.

Upon receiving UE's response (Msg3) to the RAR message (Msg2), the eNB 48 may determine if contention resolution is required such as, for example, when the eNB 48 receives two random-access preambles from two different UEs, but with the same value at the same time. The eNB 48 may resolve the contention and select one of the UEs. As noted at block 62, the eNB 48 may then send a "Message4" or "Msg4" to the selected UE—here, the UE 50—in the PDSCH.

At block 64, the UE 50 is "attached" to the eNB 48 and may establish a bi-directional communication session with the eNB 48 using the PDSCH and PUSCH to transfer user data to/from UE's user. The user can then use the UE 50 to carry out voice calls, data sessions, web browsing, and the like, using the cellular network of the eNB 48.

SUMMARY

A problem arises when analog/narrow beamforming—discussed with reference to FIGS. 1D and 1E—is used with the existing random-access scheme discussed with reference to FIG. 2. The network (i.e., the eNB) cannot tell from the random-access preamble received from the UE (in Msg1) what downlink beam is best suited or good enough for the following random-access responses (Msg2 and Msg4). The network can still be aware of the uplink beam best suited for receiving the transmissions from the UE because that information could be obtained when receiving the preamble from the UE. However, due to potential mismatch between downlink and uplink beam directions as discussed, for example, with reference to FIG. 1E, the uplink beam-related information cannot be applied in downlink. If the network/eNB is unaware of or has limited information on which downlink beam is preferred by a UE, the eNB may have to transmit the RAR message (Msg2) in either a wide beam (with lower antenna gain and, hence, with shorter range, as discussed before with reference to FIG. 1A) or in multiple narrow beams as shown, for example, in FIG. 1D. Multiple narrow beams may consume precious resources in a system with a limited number of beams. For a cellular system that only supports a limited number of simultaneous beams, different beams have to be used at different time instances when transmitting the RAR message during a random-access response (RAR) time window. The RAR window is when the UE is monitoring the downlink for the RAR message from the eNB.

Furthermore, it is rather wasteful to probe the DL beams by initiating many "parallel" procedures using the traditional one-to-one mapping (between Msg2 and Msg3) because if Msg2 is transmitted in multiple DL beams, then the eNB may need to reserve (in the UL) multiple Msg3 resources as well. If multiple Msg3 resources are reserved, then depending on which Msg2(s) is/are received by the UE, only part of the reserved Msg3 resources will be actually used by the UE to transmit its Msg3(s). Although the content in multiple Msg3 transmissions can be duplicated, only one Msg3 is needed to complete the initial random access procedure. Therefore, the reserved UL resources (for Msg3(s)) may be wasted.

Thus, when a base station employs narrow beamforming, it would be desirable to address the potential mismatch between the DL and UL beam directions so that, despite such mismatch, the RAR message during the random-access procedure of FIG. 2 is not only received by a UE, but is received over a DL beam that is good enough for that UE.

As a solution, particular embodiments of the present disclosure provide a system and method where multiple RAR messages (Msg2) from a network entity, such as an eNB, are successively transmitted to a UE, possibly at different times and/or using different beams. These multiple RAR messages are thus transmitted without interruption and before any Msg3 response is received from the UE. Each RAR message contains a message-specific scheduling-delay indicator in the UL grant carried in the RAR message. The delay indicator provides an adjustable time delay for the UE's uplink transmission scheduled by the UL grant. Thus, the present disclosure still follows the messaging order shown in FIG. 2, but with modified messaging at blocks 58 and 60 in FIG. 2. Instead of a single Msg2, multiple RAR transmissions (Msg2) are contemplated at the modified version of block 58 in particular embodiments of the present disclosure. Similarly, the response from the UE to these multiple RAR transmissions may include one or more Msg3 transmissions at the modified version of block 60 in particular embodiments of the present disclosure. The messaging at blocks 62 and 64 in FIG. 2 may remain unchanged.

According to particular embodiments of the present disclosure, multiple RAR transmissions at different time instances can schedule the same UL transmission (Msg3) for a single time instance. For a base station employing analog beam-forming, this many Msg2-to-one Msg3 mapping may solve the earlier-discussed problem with the current one Msg2-to-one Msg3 mapping between the RAR message (Msg2) and following scheduled UL transmission (Msg3). This many-to-one mapping also may enable time-domain multiplexing of several antenna beams when transmitting the RAR messages, still scheduling a single UL transmission (Msg3) from the UE. Because the best DL beam for the UE may not be known, it may be preferable to send multiple RAR messages. The UE may report the measured best DL Msg2 in its Msg3, but the Msg3 itself may not need to be repeated many times if the UL best beam is already known through earlier Msg1.

Alternatively, in other embodiments, at least two of the multiple successive RAR transmissions may schedule the UE's UL transmission at different time intervals. This approach may result in many-to-many correspondence between RAR messages and potential Msg3 transmissions from the UE. As before, all of the RAR messages are sent in succession, before any Msg3 is received from the UE. It is understood that the terms "successively transmitted" or "transmitted in succession", as used here in the context of transmissions of RAR messages as per teachings of the present disclosure, may also include "parallel" or "simultaneous" transmission of multiple RAR messages on several DL beams at each time instance. In one embodiment, a one Msg2-to-many Msg3 correspondence may be implemented as well.

The above-mentioned many-to-one and many-to-many messaging mechanisms—along with RAR message-specific adjustable time delay indicators—may increase the probability that the eNB's RAR is received by the UE, even when the eNB is unaware of or has limited information on which DL beam is best-suited for the UE. Hence, the overall robustness of the random-access procedure is increased when narrow beam-forming is used by the eNB. Furthermore, the RAR messaging mechanism discussed herein may also increase the flexibility of an eNB-based scheduler by removing restrictions as to when to schedule a RAR message (Msg2) and the following UL message (Msg3). This may be particularly useful if there is a lack of downlink and/or uplink radio resources at certain time instances when transmitting the RAR and/or receiving the UL message. In case of dynamic Time-Division Duplex (TDD) mode of operation in LTE, the RAR messaging discussed herein may also increase the scheduler flexibility regarding which sub-frames may be dynamically allocated for DL or UL.

In one embodiment, the present disclosure is directed to a method of transmitting a Random-Access Response (RAR) from a network entity to a User Equipment (UE)

when the network entity employs narrow beamforming. The method comprises performing the following by the network entity: (i) generating a plurality of RAR messages, wherein each RAR message carries a respective Uplink (UL) grant for the UE to enable the UE to respond to the RAR message; (ii) for each RAR message, providing an RAR message-specific time delay indicator in the respective UL grant carried by the RAR message; (iii) configuring each RAR message-specific time delay indicator to provide to the UE an indication of a time interval in which the UE is scheduled to transmit in the UL to respond to a respective RAR message; and (iv) successively transmitting the plurality of RAR messages to the UE.

In one embodiment, at least two of the plurality of RAR messages may be transmitted at different times. In another embodiment, at least two of the plurality of RAR messages may be transmitted using different radio beams.

In one embodiment, the time interval is the same for each RAR message regardless of which of the plurality of RAR messages the UE is responding to. This provides for a many-to-one mapping between RAR messages (Msg2) and UE's subsequent response in the UL (Msg3). In another embodiment, the time interval is different for at least two of the plurality of RAR messages. This option results in a many-to-many mapping between RAR messages and UE's UL responses.

In one embodiment, the time delay indicator may be a bit field. In particular embodiments, the indication may be a first time delay value relative to a timing of the respective RAR message carrying the indication. Alternatively, the indication may be a second time delay value relative to a timing of a UL message from the UE received by the network entity, wherein the plurality of RAR messages is transmitted by the network entity in response to the UL message. The first time delay value may be represented in terms of a first number of subframes measured from a subframe of the respective RAR message carrying the indication. On the other hand, the second time delay value may be represented in terms of a second number of subframes measured from a subframe of the UL message. The first or the second number of subframes may be represented using one or more bits in the respective RAR message such as, for example, using the time delay indicator field within the RAR message.

In particular embodiments, an equation or formula may be used by the network entity to determine the time interval in which the UE is scheduled to transmit in the UL to respond to a respective RAR message.

In one embodiment, the network entity may receive a response from the UE in the UL, wherein the response indicates which of the plurality of RAR messages the UE is responding to.

In a further embodiment, the present disclosure is directed to a method of processing an RAR received by a UE from a network entity when the network entity employs narrow beamforming. The method comprises performing the following by the UE: (i) receiving a plurality of RAR messages from the network entity, wherein each RAR message includes an RAR message-specific time delay indicator in a respective UL grant for the UE carried by the RAR message, wherein each RAR message-specific time delay indicator specifies a UL time interval in which the UE is scheduled to transmit in the UL to the network entity, and wherein one of the following applies: (a) the UL time interval is the same for each RAR message, and (b) the UL time interval is different for at least two of the plurality of RAR messages; (ii) selecting at least one of the plurality of RAR messages; and (iii) sending a response to the selected at least one RAR message during the UL time interval specified by the selected at least one RAR message, wherein the response identifies the selected at least one RAR message to the network entity.

In one embodiment, the UE may use the RAR message-specific time delay indicator associated with the selected at least one RAR message in a pre-defined formula to determine the UL time interval specified by the selected at least one RAR message.

In a still further embodiment, the present disclosure is directed to a network entity in a cellular network for transmitting a RAR to a mobile device. The network entity employs narrow beamforming and comprises the following: (i) a transceiver for transmitting a plurality of RAR messages to the mobile device; (ii) a scheduler for generating the plurality of RAR messages before they are transmitted to the mobile device; and (iii) a processor coupled to the transceiver and the scheduler, wherein the processor is operative to facilitate successive transmission by the transceiver of the plurality of RAR messages generated by the scheduler. In the network entity, the scheduler is operative to perform the following: (i) include a respective UL grant in each RAR message to enable the mobile device to respond to the RAR message; (ii) for each RAR message, provide a RAR message-specific time delay indicator in the respective UL grant carried by the RAR message; and (iii) configure each RAR message-specific time delay indicator to provide to the mobile device an indication of a time interval in which the mobile device is scheduled to transmit in the UL to respond to a respective RAR message.

In one embodiment, the network entity may be one of the following: (i) a Radio Base Station (RBS); (ii) a Base Station Controller (BSC); (iii) a Radio Network Controller (RNC); (iv) an evolved Node B (eNodeB); and (v) a group of base stations.

In another embodiment, the present disclosure is directed to a method of transmitting an RAR from a network entity to a UE when the network entity employs narrow beamforming. The method comprises performing the following by the network entity: (i) generating a RAR message, wherein the RAR message carries an UL grant for the UE to enable the UE to respond to the RAR message; (ii) providing a RAR message-specific time delay indicator in the UL grant; (iii) configuring the RAR message-specific time delay indicator to provide to the UE an indication of a time interval in which the UE is scheduled to transmit in the UL to respond to the RAR message; (iv) further providing a flag bit in the RAR message, wherein the flag bit instructs the UE to transmit a plurality of messages in the UL when responding to the RAR message as scheduled by the time interval; and (v) transmitting the RAR message to the UE. In this manner, a one-to-many mapping may be accomplished between a RAR message (Msg2) and multiple UL responses (Msg3) by the UE according to one embodiment of the present disclosure.

In the context of analog beam-forming by a network entity/base station in an LTE network, the successive transmission of multiple RAR messages, each containing an adjustable time-delay indicator according to particular embodiments of the present disclosure, provides the network entity with an opportunity to deliver at least one RAR message in a downlink beam that is good enough for a UE that has initiated the random-access procedure with the network entity. The RAR message may be delivered to the UE despite the network entity being unaware of or having limited information about which downlink beam is preferred by the UE. In this manner, the effects of a potential mismatch between uplink and downlink beam directions may be substantially mitigated, and the overall robustness of the random-access procedure may be increased.

BRIEF DESCRIPTION OF THE DRAWINGS

In the following section, the present disclosure will be described with reference to exemplary embodiments illustrated in the figures, in which:

FIG. 2 depicts an exemplary messaging flow for a random-access procedure in a 4G LTE cellular network;

FIG. 3 shows an exemplary wireless system in which the RAR messaging scheme shown in FIGS. 4-10 according to particular embodiments of the present disclosure may be implemented;

FIGS. 4A and 4B are exemplary flowcharts illustrating, respectively, transmission of RAR messages by a network entity and processing of those messages by a UE as per teachings of particular embodiments of the present disclosure;

FIG. 8 shows possible many-to-many and many-to-one mappings in a random-access procedure according to one embodiment of the present disclosure;

FIG. 9 illustrates how an UL subframe for Msg3 may be scheduled when an initially-calculated subframe for Msg3 grant indicates a subframe that is reserved for a special purpose according to one embodiment of the present disclosure;

DETAILED DESCRIPTION

Figure 1A:
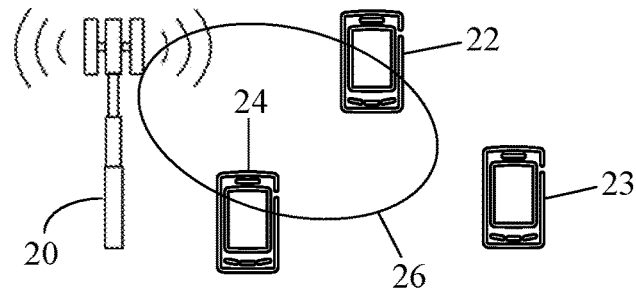
FIGS. 1A-1E illustrate different examples of antenna beam patterns and their coverage range.
Figure 1B:
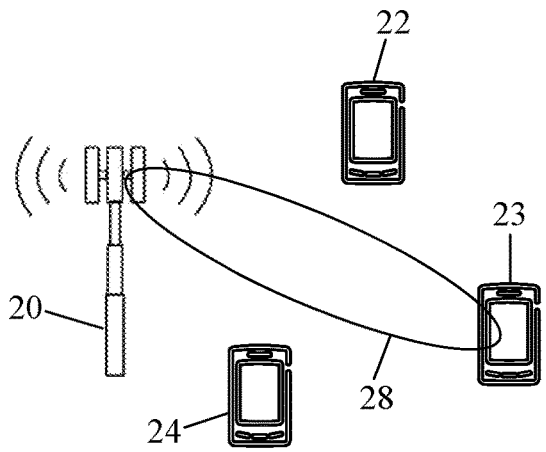
Figure 1C:
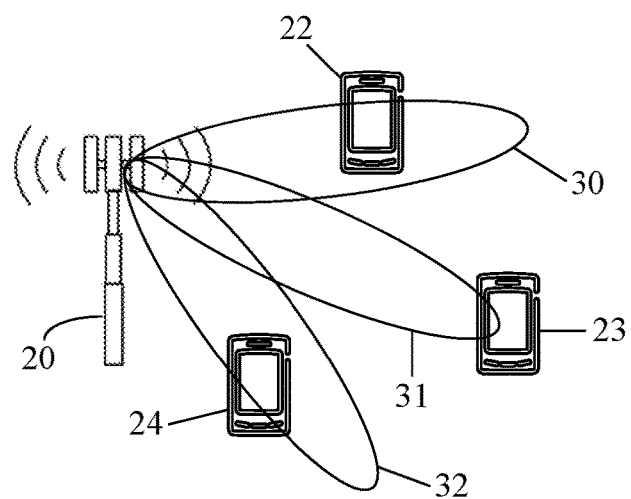

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. It should be understood that the disclosure is described primarily in the context of a Third Generation Partnership Project (3GPP) cellular telephone/data network such as, for example, an LTE network, but it can be implemented in other forms of cellular or non-cellular wireless networks as well so long as the network requires a random-access procedure similar to that illustrated in FIG. 2. Thus, the use of the term "cell" in the discussion below should not be construed to be limited to a cellular structure only.

FIG. 3 shows an exemplary wireless system 66 in which the RAR messaging scheme shown in FIGS. 4-10 according to particular embodiments of the present disclosure may be implemented. An exemplary wireless or mobile device 68 may be operational in the system 66 through a mobile communication network 70. Before the mobile device 68 is allowed to "operate" in the network 70 or to access various network-supported services and features, the mobile device 68 may need to perform a random-access procedure like the one shown in FIG. 2, but with the modified RAR messaging as per teachings of the present disclosure. In the discussion herein, the terms "wireless network," "mobile communication network," "operator network," or "carrier network" may be used interchangeably to refer to a wireless communication network 70 that facilitates voice and/or data communication with different types of wireless devices, like the device 68. The carrier network 70 may be a cellular network, a proprietary data communication network, a corporate-wide wireless network, and the like.

In one embodiment, the wireless device 68 may be a UE or a Mobile Station (MS) capable of receiving/sending data content such as, for example, audio data as part of a voice call, audio-visual data as part of a video call, textual, graphical, and/or pictorial data associated with online gaming, and the like, from/to the network 70. In one embodiment, the wireless device or UE 68 may include a RAR message-processing module such as, for example, the module 170 shown in FIG. 11 (discussed below), to process multiple RAR messages received according to the teachings of the present disclosure. The wireless device 68 may be referred to by such analogous terms as "mobile handset," "wireless handset," "mobile device," "mobile terminal," and the like. Some examples of UEs or mobile handsets/devices include cellular telephones or data transfer equipments, smartphones, handheld or laptop computers, Bluetooth® devices, electronic readers, portable electronic tablets, and the like. The data transfer equipment may include a Personal Digital Assistant (PDA) or a pager. The smartphones may include, for example, iPhones™, Android™ phones, Blackberry™ devices, and the like.

In the embodiment of FIG. 3, the carrier network 70 is shown to include an exemplary network entity 72. In the discussion herein, the term "network entity" may be interchangeably used to refer to a base station (BS) or an eNodeB/eNB. In one embodiment, the network entity 72 may represent a group of base stations interacting with the UE 68 during UE's initiation of the random-access procedure, as discussed later below. The network entity 72 may be equipped with an antenna array (or antenna unit) 74 to enable the network entity 72 to provide Radio Frequency (RF) coverage or radio interface to mobile devices, such as the UE 68, operating within the cell (not shown) associated with the network entity 72. In case of the mobile device 68, such RF coverage is illustrated in the form of an RF link 76. The network entity 72 may provide the RF link 76 to the device 68 via the antenna unit 74, and with or without the help of a secondary entity such as a pico or femto base station (not shown). It is noted here that when the wireless network 70 is a cellular LTE network, the eNB 72 may be associated with a particular cell—known as the "source cell"—and may provide RF coverage to the UE 68 as its source/serving eNB. The UE 68 may be served by the eNB 72 because it may be physically present, registered, associated with, for example, through RF coverage or prior handover, or operating within the eNB's source cell (not shown). As noted before, a "cell" and its associated base station such as, for example, an eNB (or eNodeB) may be referred to in an interchangeable manner using the same reference numeral. For example, the mobile device 68 may be interchangeably referred to as performing a random-access procedure with the base station 72 or the cell 72.

Figure 1D:
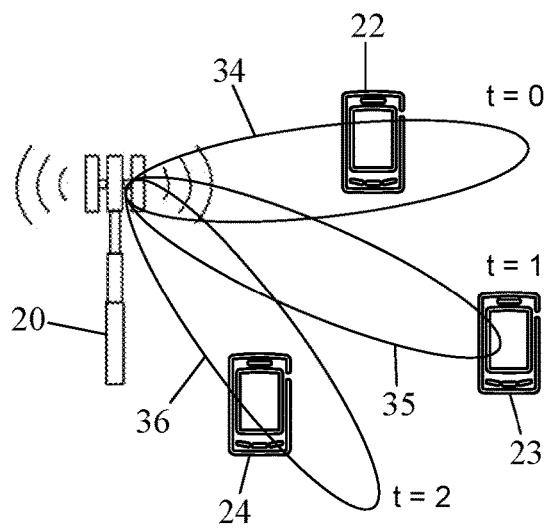
Figure 1E:
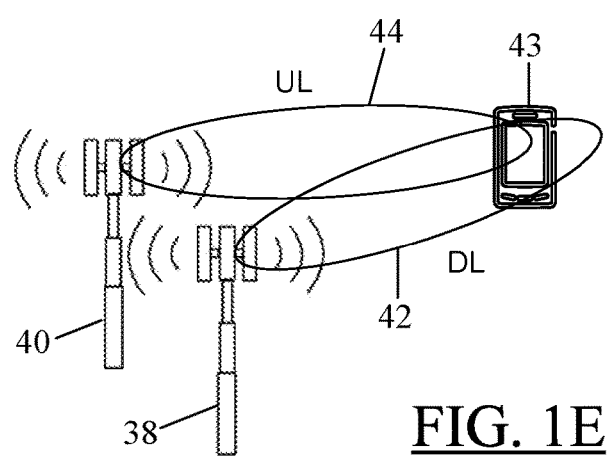

In one embodiment, the antenna array (or antenna unit) 74 may include a steerable antenna array that can provide multiple radio beams like those shown in FIG. 1D. In another embodiment, the antenna array 74 may comprise of separate transmission and reception arrays, like those shown in FIG. 1E. In yet another embodiment, the antenna array 74 may include a single antenna element or multiple antenna elements to allow the antenna array 74 to transmit and receive analog beamformed signals in one or a few beams simultaneously. Alternatively, the antenna array 74 may transmit and receive beamformed signals using multiple beams in a time-multiplexed manner in the manner similar to that shown in FIG. 1D. For ease of discussion, the antenna array 74 may not be explicitly mentioned every time a transmission/reception by the base station 72 is discussed. It is, however, understood that BS's 72 communication with the wireless device 68 is through the antenna unit 74.

In addition to providing air interface or communication channel to the UE 68, the BS 72 may also perform radio-resource management using, for example, channel feedbacks received from the UE 68. The communication channel, for example, the RF link 76, between the eNB 72 and the UE 68 may provide a conduit for the signals exchanged between the eNB 72 and the UE 68. Furthermore, the network entity or eNB 72 may be part of a cell where no Carrier Aggregation (CA) is present. However, it is understood that the teachings of the present disclosure may equally apply to a CA-based cellular configuration as well.

In the discussion below, the RAR messaging portion of a random-access procedure according to particular embodiments of the present disclosure is discussed with reference to the mobile device 68 and the network entity 72. After successful conclusion of the random-access procedure, the mobile device 68 may be considered "attached" to the network entity 72, which may be considered to be in "control" of the mobile device 68. Thus, terminals—such as the wireless device 68—operating in the wireless network 70 and attached to the base station 72 may exchange information with one another via the base station 72. The wireless network 70 may be a dense network with a large number of wireless terminals operating therein. For ease of illustration, only one such device 68 is shown in FIG. 3. The carrier network 70 may support stationary as well as mobile devices. The mobile communication network 70 may be a cellular carrier network operated, managed, and/or owned by a wireless service provider (or operator).

In one embodiment, the network entity 72 may be a base station in a Third Generation (3G) network, or a home base station or a femtocell, and may provide radio interface to respective mobile handsets attached thereto. In other embodiments, the base station may also include a site controller, an access point (AP), a Base Station Controller (BSC), a radio tower, or any other type of radio interface device capable of operating in a wireless environment.

As noted before, the base station (BS) 72 may be interchangeably referred to as a "network entity." Additionally, the BS 72 also may be referred to as an "access node" or a "mobile communication node." In case of a 3G carrier network 70, the base station 72 may include functionalities of a 3G Radio Base Station (RBS) along with some or all functionalities of a 3G Radio Network Controller (RNC), and the BS 72 also may be configured to perform the RAR messaging as per teachings of particular embodiments of the present disclosure. Communication nodes in other types of carrier networks such as, for example, Second Generation (2G) or Fourth Generation (4G) networks, and beyond, also may be configured similarly. In the embodiment of FIG. 3, the node 72 may be configured (in hardware, via software, or both) to implement the RAR messaging as per teachings of the present disclosure. For example, when existing hardware architecture of the access node 72 cannot be modified, the RAR messaging according to one embodiment of the present disclosure may be implemented through suitable programming of one or more processors in the access node 72 or a Base Station Controller (BSC) (if available). Such processor(s) may be, for example, the processor 175, or, more particularly, the scheduler 184 shown in FIG. 12. Upon execution of the program code by a processor in the node 72, the node 72 may be operative to perform various eNB-related functions such as, for example, generating RAR messages with adjustable delay indicators, sending multiple RAR messages in succession to the UE 68, receiving one or more responses from the UE 68, and so on, as discussed later. Thus, in the discussion below, although the communication node 72 (or its BSC) may be referred to as "performing," "accomplishing," or "carrying out" a function or process, it is evident to one skilled in the art that such performance may be technically accomplished in hardware and/or software as desired.

Although the discussion herein primarily refers to a base station or an eNB as a "network entity," it is understood that in certain embodiments the term "network entity" may refer to, for example, a macro base station operating in conjunction with a secondary entity such as a pico or femto base station, a secondary entity such as a pico or femto base station, a group of base stations, an RNC, a Base Transceiver Station (BTS)—with or without the functionalities of a BSC, a distributed eNB, a core network, a BSC, or a combination of one or more base stations—with or without the functionalities of a BSC or an RNC—and a CN. For example, when certain RNC functionalities are implemented in a CN, the CN may represent the "network entity". If such RNC functionalities are distributed between a BS/eNB and a CN, then the "network entity" may be a combination of such a BS/eNB and the CN. On the other hand, in particular embodiments, a combination of multiple base stations or a single BS and some other node(s) (not shown) may constitute a "network entity", such as, for example, in case of a Coordinated Multi-Point (CoMP) transmission/reception arrangement. Another entity, which may be IP-based, in the network 70 or in the wireless system 66 other than those mentioned above may be configured to perform as a "network entity" as per the teachings of the present disclosure. Any of the network entities mentioned herein may "perform," "accomplish," or "carry out" a function or process using a suitably-configured hardware and/or software as desired.

The eNB 72 in the embodiment of FIG. 3 is shown to be served and controlled by a Core Network (CN) 78. It is understood that there may be additional core networks (not shown), either in the same operator's network 70 or in other carrier networks (not shown) in the wireless system 66. When the carrier network 70 is an LTE network, the eNB 72 may be connected to the CN 78 via an "S1" interface. The core network 78 may provide logical and control functions such as, for example, terminal mobility management; access to external networks or communication entities; subscriber account management, billing, supporting the delivery of a subscriber-selected service such as a Voice over LTE (VoLTE) voice call service, and the like; Internet Protocol (IP) connectivity and interconnection to other networks (e.g., the Internet) or entities; roaming support; and so on.

In case of an LTE carrier network 70, the CN 78 may include some or all functionalities of an Access Gateway (AGW) or an Evolved Packet Core (EPC), or may function in conjunction with a subnet-specific gateway/control node (not shown). In certain embodiments, the CN 78 may be, for example, an International Mobile Telecommunications (IMT) CN such as a 3GPP CN. In other embodiments, the CN 78 may be, for example, another type of IMT CN such as a 3GPP2 CN (for Code-Division Multiple Access (CDMA) based cellular systems), or an ETSI TISPAN (European Telecommunications Standards Institute TIPHON (Telecommunications and Internet Protocol Harmonization over Networks) and SPAN (Services and Protocols for Advanced Networks)) CN.

Regardless of the type of the carrier network 70, the core network 78 may function to provide connection of one or more of the UEs, like the UE 68, to their respective eNBs and, through the eNBs, to other mobile handsets operating in the carrier network 70 and also to other communication devices or resources in other voice and/or data networks external to the carrier network 70. The communication devices may include wireline or wireless phones, whereas the resources may include an Internet website. The core network 78 may be coupled to a packet-switched network 80 such as, for example, an Internet Protocol (IP) network like the Internet as well as to a circuit-switched network 81, such as the Public Switched Telephone Network (PSTN), to accomplish the desired connections for the UE 68 beyond the devices operating in the carrier network 70. Thus, through the eNB's 72 connection to the core network 78 and the UE's 68 radio link 76 with the eNB 72, a user of the UE 68 may wirelessly (and seamlessly) access many different resources or systems beyond those operating within the operator's network 70.

The carrier network 70 may be a cellular telephone network, a Public Land Mobile Network (PLMN), or a non-cellular wireless network which may be a voice network, data network, or both. As noted earlier, the carrier network 70 may include multiple cell sites (not shown). A wireless terminal, such as the UE 68, may be a subscriber unit in the carrier network 70. Furthermore, portions of the carrier network 70 may include, independently or in combination, any of the present or future wireline or wireless communication networks such as, for example, the PSTN, an IP Multimedia Subsystem (IMS) based network, or a satellite-based communication link. Similarly, as also mentioned above, the carrier network 70 may be connected to the Internet via its core network's 78 connection to the IP network 80 or may include a portion of the Internet as part thereof. In one embodiment, the operator network 70 or the wireless system 66 may include more or less or different types of functional entities than those shown in FIG. 3.

Although various examples in the discussion below are provided primarily in the context of an LTE network, the teachings of the present disclosure may equally apply, with suitable modifications as may be apparent to one skilled in the art using the present teachings, to a number of different Frequency-Division Multiplex (FDM) or Time-Division Multiplex (TDM) based wireless systems or networks—cellular or non-cellular—that may require the mobile handsets to perform a random-access procedure similar to that discussed earlier with reference to FIG. 2. Such networks or systems may include, for example, standard-based systems/networks using Second Generation (2G), Third Generation (3G), or Fourth Generation (4G) specifications, or non-standard based systems. Some examples of such systems or networks include, but not limited to, Global System for Mobile communications (GSM) networks, Telecommunications Industry Association/Electronic Industries Alliance (TIA/EIA) Interim Standard-136 (IS-136) based Time-Division Multiple Access (TDMA) systems, Wideband Code-Division Multiple Access (WCDMA) systems, 3GPP LTE networks, WCDMA-based High-Speed Packet Access (HSPA) systems, 3GPP2's CDMA-based High-Rate Packet Data (HRPD) systems, CDMA2000 or TIA/EIA IS-2000 systems, Evolution-Data Optimized (EV-DO) systems, Worldwide Interoperability for Microwave Access (WiMAX) systems based on Institute of Electrical and Electronics Engineers (IEEE) standard IEEE 802.16e, International Mobile Telecommunications-Advanced (IMT-Advanced) systems such as LTE Advanced systems, other Universal Terrestrial Radio-Access Networks (UTRAN) or Evolved-UTRAN (E-UTRAN) networks, GSM/Enhanced Data Rate for GSM Evolution (GSM/EDGE) systems, a non-standard based proprietary corporate wireless network, and so on.

Figure 4B:
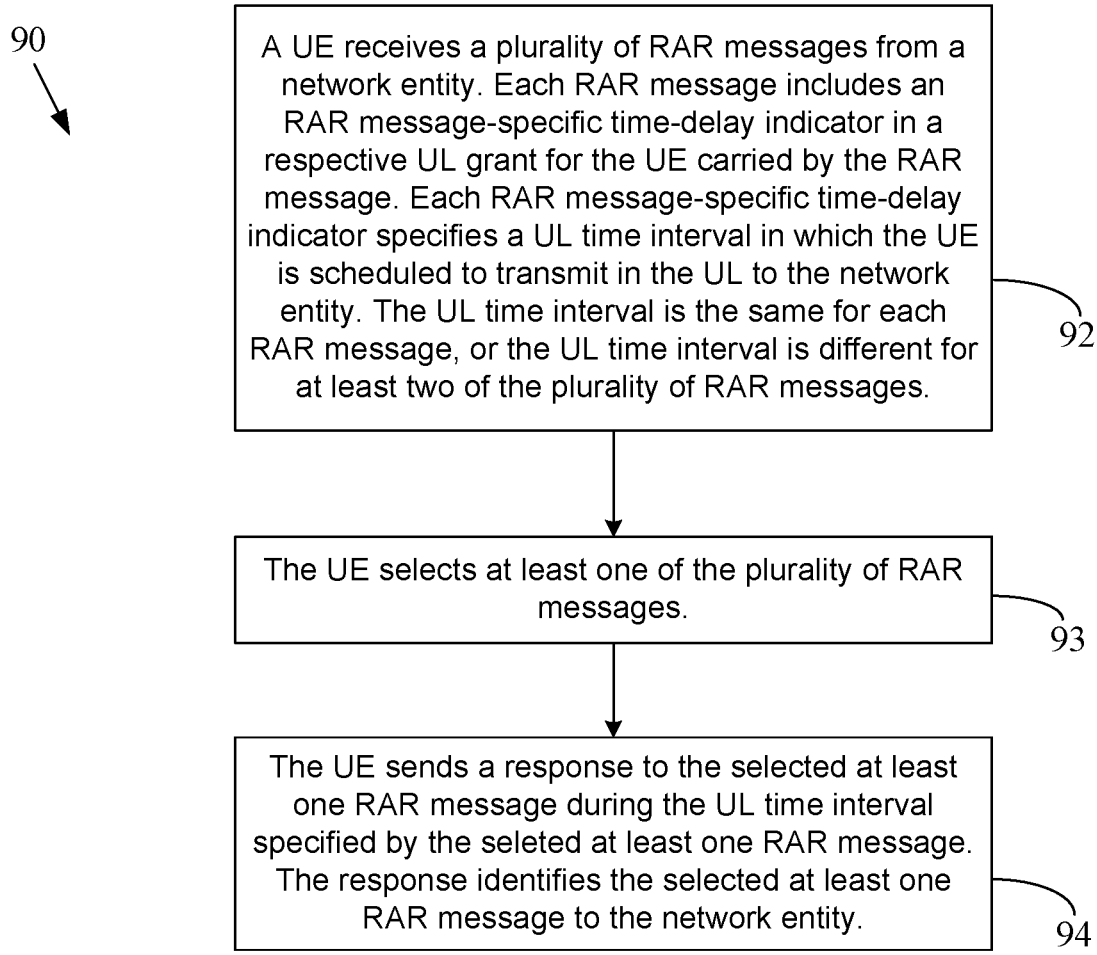

FIGS. 4A and 4B are exemplary flowcharts 83, 90 illustrating, respectively, transmission of RAR messages by a network entity, such as the base station/eNB 72, and processing of those messages by a UE, such as the UE 68, as per teachings of particular embodiments of the present disclosure. In the discussion herein, FIGS. 4A and 4B may be collectively referred to as "FIG. 4." The flowchart 83 in FIG. 4A may relate to a method of transmitting a Random-Access Response (RAR) from the network entity 72 to the UE 68 when the network entity employs narrow beamforming. Various method steps illustrated in FIG. 4A may be performed by the network entity 72. On the other hand, the flowchart 90 in FIG. 4B relates to a method of processing the RAR received by the UE 68 from the network entity 72. Various method steps illustrated in FIG. 4B may be performed by the UE 68. Thus, in particular embodiments, the flowchart 83 in FIG. 4A may be considered as a modified version of the RAR messaging operation—Msg2 transmission—shown at block 58 in FIG. 2, and the flowchart 90 in FIG. 4B may be considered as a modified version of the Msg3 transmission shown at block 60 in FIG. 2.

Figure 5:
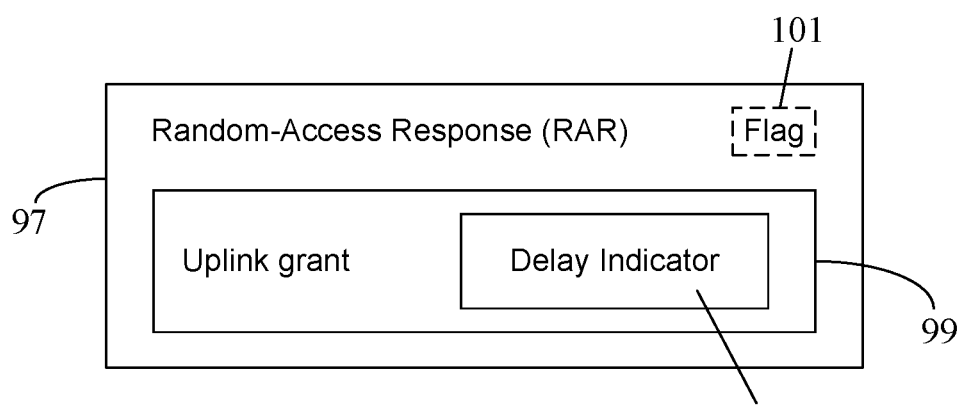
FIG. 5 shows the block diagram of an exemplary RAR message according to particular embodiments of the present disclosure.

Referring now to block 85 in FIG. 4A, in one embodiment, the network entity 72 may generate a plurality of RAR messages as per teachings of the present disclosure. Each RAR message may carry a respective UL grant for the UE 68 to enable the UE to respond to the RAR message. As indicated at block 86, for each RAR message, the network entity 72 may provide a RAR message-specific time-delay indicator in the respective UL grant carried by the RAR message. An exemplary RAR message according to one embodiment of the present disclosure is shown in FIG. 5, which is discussed below. The network entity 72 may also configure each RAR message-specific time delay indicator to provide to the UE an indication of a time interval in which the UE is scheduled to transmit its Msg3 in the UL to respond to a respective RAR message, as noted at block 87. In one embodiment, as discussed in more detail below, the time interval may be the same for each RAR message regardless of which of the plurality of RAR messages the UE is responding to. This may result in a many-to-one correspondence between multiple RAR messages (Msg2) and a single Msg3. On the other hand, in another embodiment, the time interval may be different for at least two of the plurality of RAR messages generated by the network entity. In that case, a many-to-many correspondence may arise between "n" RAR messages (Msg2) and "m" Msg3 responses, where n≥m≥2. As indicated at block 88, the network entity 72 may successively transmit to the UE 68 all the RAR messages in the plurality of messages before any response (Msg3) from the UE is received by the network entity in the UL. As noted before, this uninterrupted transmission of multiple RAR messages may increase the probability that the RAR from the network entity 72 is indeed received by the UE 68, preferably over a downlink beam that is good enough for the UE 68 to receive the RAR Msg2.

Referring now to FIG. 4B, as indicated at block 92, the UE 68 may receive the plurality of RAR messages from the network entity 72. As mentioned with reference to blocks 86-87 and as noted at block 92, each received RAR message may include a RAR message-specific time-delay indicator in a respective UL grant for the UE carried by the RAR message. Furthermore, each RAR message-specific time-delay indicator may specify a UL time interval in which the UE 68 is scheduled to transmit Msg3 in the UL to the network entity 72 as part of the random-access procedure to be carried out between the UE and the network entity. In one embodiment, the UL time interval may be the same for each RAR message, which may result in the earlier-mentioned many-to-one mapping between multiple RAR messages (Msg2) and a single UE response (Msg3). In another embodiment, the UL time interval may be different for at least two of the plurality of RAR messages received from the network entity 72, which may support the earlier-mentioned many-to-many mapping between RAR messages (Msg2) and potential UE responses (Msg3).

As mentioned at block 93 in FIG. 4B, the UE 68 may select at least one of the plurality of RAR messages for processing and response. Then, as noted at block 94, the UE 68 may send to the network entity 72 a response to the selected at least one RAR message. The response from the UE 68 may be sent during the UL time interval specified by the selected RAR message. In one embodiment, the response from the UE 68 may also identify the selected RAR message to the network entity 72.

FIG. 5 shows the block diagram of an exemplary RAR message 97 according to particular embodiments of the present disclosure. The RAR message 97 may have a pre-determined number of bits dedicated as an uplink grant 99, which schedules the UE 68 to send its Msg3 in the uplink. Although the RAR message 97 is different from the RAR message mentioned with reference to block 58 in FIG. 2, the term "Msg2" still may be used in the context of the RAR message 97 to maintain consistency with relevant technical literature. In one embodiment, the terms "RAR message," "RAR grant," or "UL grant" may be used interchangeably because the RAR message 97 is essentially an UL grant-carrying message. In that case, the separate UL grant field 99 may not need to be shown; it may be "merged" with the overall RAR message block 97. However, for ease of discussion herein, the UL grant field 99 is treated separate from, but a part of the RAR message 97.

As shown in FIG. 5, the UL grant field 99 carried by the RAR message 97 may contain an RAR message-specific time delay indicator 100. The delay indicator 100 may be relative to (or specific to) the RAR message 97 such that the time instance—for example, a subframe—where the scheduled UL transmission (Msg3) takes place can be individually adjusted for each RAR message. As discussed below, the network entity 72—more specifically, a scheduler in the network entity—may configure the RAR message-specific time-delay indicator 100 to provide to the UE 68 an indication of a time interval in which the UE is scheduled to transmit in the UL to respond to the respective RAR message. In particular embodiments, the time interval specified through the delay indicator 100 may be a radio subframe having a pre-defined duration such as, for example, 1 ms, 0.2 ms, and the like. The term "subframe" is used herein to refer to a pre-defined portion of a radio frame in a standards-based cellular communication network such as, for example, when the carrier network 70 is an LTE network. In other embodiments, the time interval may be other than a subframe, for example, when the communication between the network entity 72 and the wireless device 68 is not based on a "subframe."

The delay indicator 100 may be a bit field where a pre-determined number of bits may be used to indicate the UL time interval (or subframe). For example, as discussed later with reference to FIGS. 6-10, the bit field may be 1-bit long, 2-bit long, or 4-bit long. However, depending on the desired implementation, the number of bits constituting the delay indicator bit field 100 may be different from that discussed herein. Through the bits in the bit field, the eNB 72 may provide a time-delay value to indicate to the UE 68 the UL time interval (or subframe) for Msg3 transmission. In particular embodiments, the time-delay value may be in terms of a specific number of subframes the UE 68 may need to wait before sending its Msg3 to the eNB 72.

Figures 6, 7:
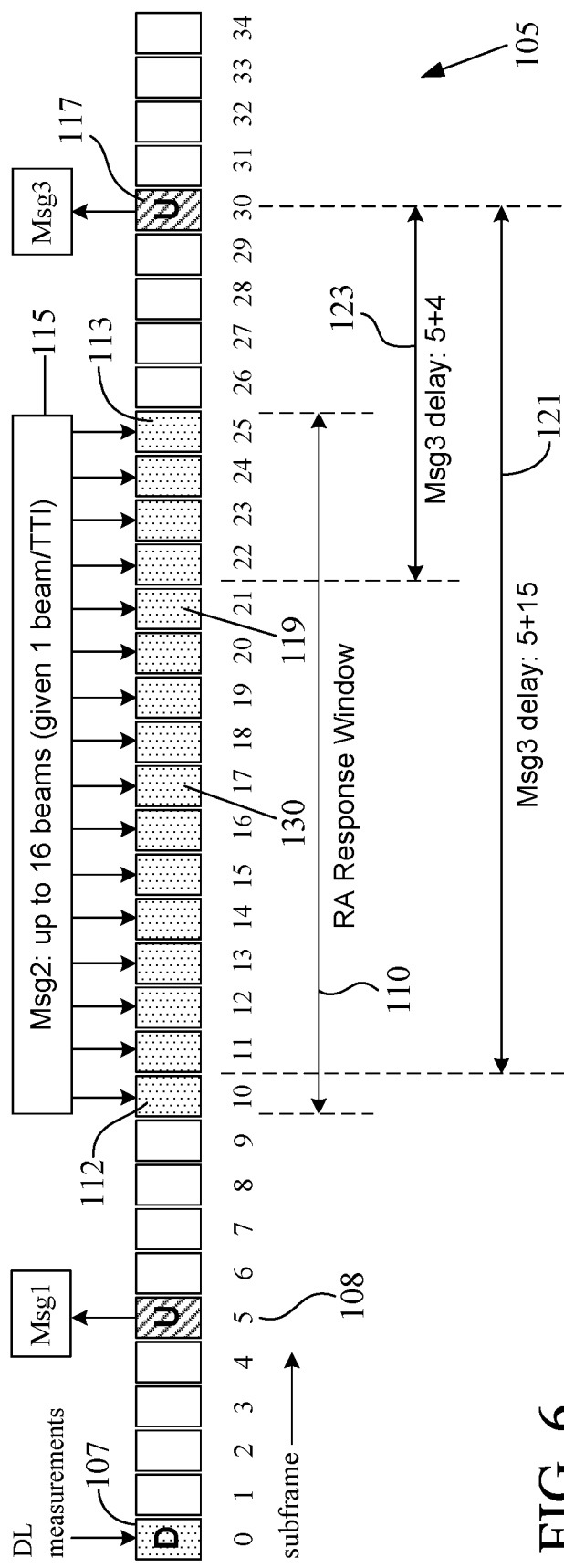
FIG. 6 illustrates an exemplary many-to-one mapping in a random-access procedure according to one embodiment of the present disclosure.
FIG. 7 illustrates how the eNB in FIG. 3 may use beam-switching to enable a UE to receive at least one of the plurality of RAR messages transmitted by the eNB according to one embodiment of the present disclosure.

As discussed in more detail below, in one embodiment, each RAR message may specify the same time interval (subframe) even when multiple RAR messages—having structure similar to the RAR message 97—are sent by the network entity 72, and regardless of which of those multiple RAR messages the UE 68 may be responding to. In another embodiment, however, at least two of the RAR messages sent by the network entity 72 may specify different subframes for Msg3 from the UE 68. In case of the same time interval-based RAR messaging, the UE 68 that monitors the RAR transmissions during the RAR time window—which may constitute multiple subframes as per particular embodiments of the present disclosure—may be then granted to transmit in the same subframe regardless of which RAR message it detects. This enables the eNB 72 to transmit its RAR messages in different beams and/or at different time instances, thus increasing the probability of picking a DL beam that is most suitable (or simply good enough) for the UE 68 to receive an RAR message. FIG. 6 (discussed below) is an example of such many-to-one mapping.

In some cases, the UE 68 may be able to detect several of the RAR messages from the eNB 72. These RAR messages may have the format similar to the RAR message 97 in FIG. 5. If these RAR messages do not contain exactly the same payload, such as, for example, preamble index, timing advance, and UL grant, then the UE 68 may select one RAR message from the detected set of RAR messages as being the "best" RAR message. This "best" RAR message, however, must still contain the preamble index corresponding to the preamble transmitted by the UE 68 as part of its Msg1 to the eNB 72. Such transmission of Msg1 may be similar to that discussed earlier with reference to block 56 in FIG. 2. In one embodiment, the UE 68 may select this "best" RAR message according to a pre-defined criterion. For example, from the received set of RAR messages, the best RAR message may be selected as the RAR message having the largest Signal to Interference and Noise Ratio (SINR) or received power. Alternatively, the best RAR message may be selected as the first RAR message that is successfully received by the UE 68 or that is successfully received according to another priority order. Such other priority order may be indicated by the eNB 72 in the RAR message itself or may be given beforehand to the UE 68—either by appropriate cellular network specification or higher-layer configuration—during, for example, UE's manufacture, first power-up in the respective service provider's network, or hardware/software configuration by the service provider. In any event, the UE 68 may transmit its response (Msg3) to the "best" RAR message 97 according to the UL grant 99 in the selected RAR message 97.

In one embodiment, a one-to-many (one Msg2-to-many Msg3) mapping may be used by the eNB 72 if the UL best (or preferable) beam is unknown or may not be readily determined from the UE's Msg1—like the Msg1 at block 56 in FIG. 2. In another embodiment, a many-to-many (many Msg2-to-many Msg3) mapping may be used instead. In this manner, the eNB 72 can try different beams in the UL to determine the best UL beam for the UE 68.

In particular embodiments, the same PRACH preamble sent by the UE 68 as part of its Msg1—like the Msg1 at block 56 in FIG. 2—may be detected by multiple eNBs, access points, or other similar nodes in the network 70. However, each such node may detect the PRACH preamble with a different timing advance, and respond with a corresponding RAR message (Msg2) because the network 70 may, for example, want the UE 68 to try several Msg3 transmissions with different timing-advance adjustments. When the UE 68 receives multiple RAR messages from multiple nodes/access points (not shown) in the network 70, the UE 68 may select a set of RAR messages to respond to. Each selected RAR message may contain a different uplink grant, like the UL grant 99 in FIG. 5. The UE 68 may then transmit its Msg3 in several subframes—one subframe per selected RAR message, based on the UL grant in the message. Each Msg3 may be transmitted with the timing advance as specified in the corresponding RAR message.

As mentioned above, in one embodiment, multiple RAR messages may be received by the UE 68, for example, from different access points or nodes (not shown) in the carrier network 70. In one embodiment, the UE 68 may have more than one antenna to receive multiple RAR messages that are sent via different beams simultaneously. These multiple access points/nodes/base stations sending the RAR messages to the UE 68 may be collectively considered a "network entity" in particular embodiments, as mentioned before. This situation may arise in the context of a CoMP transmission/reception arrangement mentioned before. When the UE 68 responds with several Msg3 transmissions, these Msg3 transmissions are then intended for different access points as well. In another embodiment, several RAR messages may be transmitted in different beams from the same access point or eNB, and the following Msg3 transmissions can then be received in different beams in the same access point during different time instances.

In one embodiment, the UE 68 may be configured to indicate in its Msg3 response which of the multiple RAR messages the UE 68 is responding to. Thus, the Msg3 may be configured to contain information regarding which RAR message was detected by the UE 68 in case the multiple RARs from the eNB 72 schedule the same UL transmission (Msg3). In one embodiment, the Msg3 from the UE 68 may include a "Msg3 delay" field that includes the time-delay value specified by the delay indicator 100 in the corresponding RAR message 97 detected by the UE 68 and to which the UE is responding. Based on the value in the "Msg3 delay" field, the eNB 72 may figure out which RAR message in the downlink was successfully received by the UE 68. This is beneficial because it gives the network/eNB knowledge about which downlink beam is suitable for the UE 68 in further downlink transmissions. In one embodiment, the existing standardized format of Msg3 may be modified to include the "Msg3 delay" field as a new field.

FIG. 6 illustrates an exemplary many-to-one mapping in a random-access procedure according to one embodiment of the present disclosure. In FIG. 6, by way of an example, a plurality of subframes for UL and DL transmissions between the eNB 72 and the UE 68 are shown as a sequence 105. For ease of discussion, the subframes are counted starting with number "0" to indicate commencement of a random-access procedure similar to that shown in FIG. 2. It is understood that the subframe-0—which is identified by reference numeral "107" in FIG. 6—may not necessarily be the very first subframe utilized by the eNB 72; it may be any subframe in an ongoing subframe-based communication by the eNB 72, for example, with other UEs (not shown), in the network 70. As indicated at DL subframe 107, the eNB 72 may send various DL measurements similar to those discussed earlier with reference to blocks 52 and 54 in FIG. 2. Subsequently, the UE 68 may initiate the RA procedure by sending its Msg1 in the UL subframe-5, which is identified using the reference numeral "108." In the embodiment of FIG. 6, the Msg1 is sent after a minimum scheduling delay of five (5) subframes. Thus, as shown, the UL subframe 108 is the fifth subframe from the DL subframe 107. This minimum scheduling delay may vary in different embodiments. It is observed here that the Msg1 may not be typically scheduled by the scheduler in the eNB 72, but rather decided ("scheduled") by the UE 68. In one embodiment, the UE 68 may be pre-configured with the information about the PRACH resource to be used for the Msg1 transmission subframe, enabling the UE 68 to send its Msg1 accordingly. Such pre-configuration information may be part of the information received at block 54 (FIG. 2). Alternatively, in another embodiment, the PRACH subframe can be a fixed subframe defined in the appropriate 3GPP standard.

In the sequence 105, a subframe carrying DL signals is shown using a dotted rectangle with letter "D" inside, whereas a subframe carrying UL signals is shown using a rectangle with slanted lines and with letter "U" inside. However, in some instances, these letters are omitted for the sake of clarity of the drawing. Furthermore, in the discussion herein, a subframe is identified in one of two ways depending on the context of discussion: (a) Using the subframe number, like "subframe-5", "subframe-10," "subframe-17", and so on, or (b) using a corresponding reference numeral without a dash ("-") linking the word "subframe" and its reference numeral, like "subframe 108" (referring to subframe-5), "subframe 112" (referring to subframe-10), and so on.

In the illustration of FIG. 6, an RA-response window 110 also starts after the fixed minimum scheduling delay of 5 subframes. Thus, as shown, the RA-response window 110 may start from subframe-10, which is identified using the reference numeral "112" and is the fifth subframe after the Msg1 subframe 108. In one embodiment, the value of the RAR window 110 may be a system variable that can be signaled to the UE 68 as the ra-ResponseWindow parameter in the System Information (SI) broadcast in the network 70, like the SI at block 54 in FIG. 2. In the example of FIG. 6, the random-access response window 110 is shown to span sixteen (16) DL subframes—from subframe-10 to subframe-25 (which is identified by reference numeral "113"). For ease of illustration, only the relevant subframes in the RAR window 110 are identified with reference numerals. Furthermore, for simplicity of illustration, the letter "D" is omitted from the subframes in the RAR window 110. After sending its Msg1, the UE 68 may monitor Msg2 during the RAR window 110. The multiple RAR messages according to teachings of the present disclosure may be successively transmitted through a RAR window. In the embodiment of FIG. 6, sixteen (16) RAR messages (Msg2) are shown to be transmitted by the eNB 72 in up to 16 different DL beams, using 1 beam per TTI (or subframe) as noted at block 115. In particular embodiments, more than one subframe may be transmitted by repeating the same beam in several subframes, in which case there may be less than 16 beams. In another embodiment, there could be more than one beam in each TTI transmitting the same Msg2. This may be useful in a situation where more DL beams need to be probed than there are available subframes in the RAR window. Each RAR message is configured such that the message-specific delay indicator 100 provides the same time interval (or subframe) for the UE 68 to send its Msg3, regardless of which of the RAR messages in the RAR window 110 the UE 68 is responding to. Thus, as shown in FIG. 6, each RAR message-specific UL grant, like the UL grant 99 in FIG. 5, carried by a RAR message in the RAR window 110 schedules the following UL transmission (Msg3) in the subframe-30, which is identified by reference numeral "117."

The above-mentioned mapping of many Msg2-to-one Msg3 may be accomplished using an offset that indicates a delay relative to the subframe in which the respective RAR message is transmitted. As discussed below, the delay-indicating offset may be provided through appropriate bit values in the RAR message-specific delay-indicator field 100. Two examples of these relative delays are shown in FIG. 6 in the context of subframe-10 and subframe-21, which is identified by reference numeral "119." Assuming the scheduling of Msg3 in the UL subframe 117 and assuming the previously-mentioned fixed minimum scheduling delay of 5 subframes, the RAR message-specific delay indicator 100 in the RAR message in the DL subframe 112 would indicate a total delay value of 20 subframes, thereby informing the UE 68 to delay its transmission of Msg3 until the 20$^{th}$ subframe—which will be subframe-30—is reached after subframe-10, as illustrated by arrow 121. On the other hand, the delay indicator in the RAR message in the DL subframe 119 would indicate a total delay value of only 9 subframes to specify the 30$^{th}$ subframe 117 for UE's Msg3, as illustrated by arrow 123. In the exemplary illustration of FIG. 6, the delay offset in a RAR message in the RAR window 110 may take values between 5 (for the last subframe 113) and 20 (for the first subframe 112).

In one embodiment, the RAR message-specific delay indicator 100 may be a bit field indicating a delay value ranging from 0 to "d". The delay value may be such that the total scheduling delay measured in subframes from the respective RAR message becomes "$d_0+d$" subframes, where "$d_0$" is the fixed minimum scheduling delay implemented by the eNB 72. Thus, for an UL grant, like the UL grant 99 in FIG. 5, carried by a RAR message transmitted in subframe number "$n_{grant}$", the Msg3 may be scheduled to be transmitted in a subframe that is derived using the following formula or equation:

$$\text{Msg3 subframe} = n_{grant} + d_0 + d \quad (1)$$

By way of an example, for subframe 112 in FIG. 6, $n_{grant}=10$, $d_0=5$, and $d=15$; whereas for subframe 119 in FIG. 6, $n_{grant}=21$, $d_0=5$, and $d=4$. In particular embodiments, the UE 68 may be configured, for example, by the eNB 72, with the network-specific value of "$d_0$" and with the above formula to enable the UE 68 to calculate the UL subframe for Msg3 based on the value of "d" in the RAR message detected by the UE 68.

Assuming $d_0=5$, in the context of the embodiment of FIG. 6, the delay-indicator field 100 in each RAR message in the window 110 may be a 4-bit field representing a value of "d" from the set d={0, 1, . . . , 15}. Thus, for example, the delay-indicator field 100 in the RAR message at subframe 113 in FIG. 6 would contain the bits "0000" for d=0, the delay-indicator field 100 in the RAR message at subframe 112 would contain the bits "1111" for d=15, the delay-indicator field 100 in the RAR message at subframe 119 would contain the binary bits "0100" for d=4, and so on. Thus, in order to schedule the same UL subframe—for example, the subframe 117 in FIG. 6—using different RAR messages transmitted in consecutive DL subframes, the eNB 72 may reduce the value of the delay "d" by "1" for each RAR transmission attempt.

In particular embodiments, for each RAR transmission attempt, the eNB 72 may also switch the DL beam in order to eventually cover the targeted UE 68. FIG. 7 illustrates how the eNB 72 in FIG. 3 may use beam-switching to enable a UE, such as the UE 68, to receive at least one of the plurality of RAR messages transmitted by the eNB 72 according to one embodiment of the present disclosure. The subframe-15 through subframe-17 listed in FIG. 7 are shown in FIG. 6 under the RAR window segment 110. For ease of illustration, the beams for all subframes in the RAR window 110 are not shown in FIG. 7. As shown in FIG. 7, the RAR messages (Msg2) may be transmitted in different beams 125-127 and in different subframes, but the UE 68 is able to receive it only in subframe-17, which is identified by reference numeral "130" in FIG. 6. For the RAR message transmitted in the DL subframe-17, the above-mentioned equation (1) would result in the following values when Msg3 is scheduled for UL subframe-30: $n_{grant}=17$, $d_0=5$, and $d=8$. Hence, in case of the above-mentioned 4-bit delay representation, the delay-indicator field 100 in the RAR message at subframe 130 would contain the binary bits "1000" for d=8. As noted before, the UE 68 already may be aware of the pre-defined formula "$n_{grant}+d_0+d$". Hence, the UE 68 may use the received value of "d" in that formula to determine that subframe-30 has been scheduled by the eNB 72 as the UL grant for UE's response Msg3.

In another embodiment, the resolution of the delay-indicator field 100—the value of which is represented by the parameter "d" mentioned above—may be decreased, such as, for example, by using less number of bits for the parameter "d." Hence, the total number of bits in the UL grant field 99 (FIG. 5) is reduced as well. Such reduced resolution may allow many-to-many mapping between RAR messages and corresponding UL responses (Msg3) as discussed below with reference to FIG. 8.

FIG. 8 shows possible many-to-many and many-to-one mappings in a random-access procedure according to one embodiment of the present disclosure. The exemplary subframe sequence 135 in FIG. 8 is substantially similar to the sequence 105 in FIG. 6 and, hence, for ease of discussion, the same reference numerals are used in FIGS. 6 and 8 for common elements, features, or functionality. However, discussion of such common elements or features is not repeated for the sake of brevity. The exemplary sequence 135 in FIG. 8 differs from the earlier-discussed sequence 105 in FIG. 6 in that the RAR window 137 in FIG. 8 is longer than that in FIG. 6. The RAR window 137 in FIG. 8 spans from subframe-10 (reference numeral "112") to subframe-33, which is identified by reference numeral "139." Furthermore, only four (4) RAR messages are shown to be sent via successive DL subframes 10 through 13 in FIG. 8, as opposed to sixteen (16) RAR messages in FIG. 6. The subframe-13 is identified by reference numeral "140." For ease of illustration, subframes 11 and 12 are not identified using reference numerals.

In the embodiment of FIG. 8, the eNB 72 may use the following formula or equation to determine the UL subframe(s) that may be specified to the UE 68 for Msg3:

$$\text{Msg3 subframe} = [(n_{grant} + d_0 + dN_{res})/N_{res}]N_{res} \quad (2)$$

The above equation may also be written as: Msg3 subframe= (ceil((n_{grant}+d_0+dN_{res})/Nres))*Nres, where "ceil" refers to the "ceiling" operation. In the above equation (2), the parameters "$n_{grant}$" and "$d_0$" are the same as those in equation (1). In other words, "$n_{grant}$" represents the number of the DL subframe in which an UL grant for Msg3 is being transmitted, and "$d_0$" represents the fixed minimum scheduling delay, which is assumed to be of 5 subframes ($d_0$=5) in the discussion herein. The parameter "$N_{res}$" refers to a pre-determined resolution, which, in the discussion herein, is assumed to be a resolution of every 5$^{th}$ subframe ($N_{res}$=5). As before, in particular embodiments, the pre-determined values of "$d_0$" and "$N_{res}$" may be made available to the UE 68 in advance—such as, for example, upon UE's initial registration in the operator's network 70, or through appropriate SI message(s) from the eNB 72, or upon UE's adaptation by its manufacturer or a cellular service provider for operation within the carrier network 70—to enable the UE 68 to determine the appropriate UL subframe for transmission of its Msg3 using the value of "d" received in the corresponding DL subframe "$n_{grant}$". In the embodiment of FIG. 8, the parameter "d" in equation (2) is only of one bit length, giving two possible binary values for d—either "0" or "1", or d={0,1}. Hence, the delay indicator field 100 (FIG. 5) in each DL Msg2 in subframes 10 through 13 will be of 1-bit length only, as opposed to the 4-bit length version in the embodiment of FIG. 6.

Referring now to equation (2), with the above-mentioned values for "$d_0$" and "$N_{res}$", the following calculations may result from different values of "d" for a given "$n_{grant}$". For $n_{grant}$=10 (referring to subframe-10 in FIG. 8), the corresponding Msg3 may be scheduled for UL subframe-15 (when d=0) or UL subframe-20 (when d=1). The subframe-15 is identified by reference numeral "142", and the subframe-20 is identified by reference numeral "143." For $n_{grant}$=11 (referring to subframe-11 in FIG. 8), the corresponding Msg3 may be scheduled for UL subframe-20 (when d=0) or UL subframe-25 (when d=1). Similarly, for $n_{grant}$=12 (referring to subframe-12 in FIG. 8) and $n_{grant}$=13 (referring to subframe-13 in FIG. 8), the subframe-20 (for d=0 in each case) or the subframe-25 (for d=1 in each case) may be scheduled for UL Msg3. Although not identified in FIG. 8, the subframe-25 is identified by reference numeral "152" in FIG. 9.

From the above calculations, it is observed that potentially three different UL subframes 142-143 may be specified for Msg3 depending on the value of "d." If the scheduler in the eNB 72 is configured to implement a many Msg2-to-many Msg3 mapping, then the scheduler may specify d=0 for the delay-indicator fields in the RAR messages at subframe-10, subframe-11, subframe-12, and subframe-13. In this case, at least two RAR messages may specify different time instances—subframe-15 and subframe-20 illustrated in FIG. 8—in which the UE 68 may be scheduled to transmit its Msg3 in the UL. Different values of "d" for different RAR messages may be used as well for the many-to-many mapping. On the other hand, if the scheduler in the eNB 72 is configured to implement a many Msg2-to-one Msg3 mapping, then the scheduler may specify d=1 for the delay-indicator field in the RAR message in subframe-10 and d=0 for the delay indicator fields in each of the RAR messages transmitted in subframes 11 through 13. In this many-to-one case, the UE 68 can transmit its Msg3 in the subframe-20 only regardless of which of the plurality of Msg2 the UE is responding to, as is illustrated by arrows collectively identified using the reference numeral "145" in FIG. 8.

It is noted here that the candidate subframes 15 and 20 in FIG. 8 are exemplary only. An equation that is different than equation (2), or a different value of "$d_0$" or any other parameter in equation (2), may result in more than two candidate subframes. In that case, it is understood that an eNB 72 may schedule more than two UL subframes for Msg3 using an approach that is similar to the many-to-many mapping discussed with reference to FIG. 8. As mentioned before, if the UL best (or most suitable) beam for the UE 68 is unknown or may not be readily determined from the UE's Msg1—like the Msg1 at block 56 in FIG. 2, then eNB 72 may use a one-to-many mapping (discussed below) for Msg3 so that the eNB 72 can try different beams in the UL to determine the best UL beam for the UE 68.

In one embodiment, a one-to-many (one Msg2-to-many Msg3) mapping may be used by the eNB 72, for example, to determine the best UL beam for the UE 68. A RAR message (Msg2), like the RAR message 97 in FIG. 5, may be configured to include a "one-to-many" flag/parameter (not shown in FIG. 5) that can be signaled to the UE 68 in the RAR message. In one embodiment, this flag may be a separate, single-bit field 101 as shown by a dotted block in FIG. 5. In another embodiment, this flag may be part of the UL grant 99 or the delay indicator field 100 such as, for example, an extra bit appended to the binary value of "d"—either at the end or at the beginning of the bits constituting "d." If a RAR message contains such one-to-many flag or the flag bit has been asserted by the eNB 72, then the UE 68 may interpret the flag in a pre-defined manner. For example, the UE 68 may first use the RAR message-specific delay-indicator value "d" in a pre-defined formula—like the equation (2) above—to determine the UL subframe for its subsequent Msg3. The UE 68 may then also consider a pre-determined number of consecutive subframes, for example, three (3) subframes, after the initially-determined subframe as being scheduled for its Msg3, when the one-to-many flag is present in the RAR message. In this manner, a single RAR message may be used to signal multiple consecutive UL subframes to the UE 68 for Msg3 transmission. The RAR message with one-to-many flag may be sent alone or may be one of the multiple RAR messages transmitted by the eNB 72. In particular embodiments, it may be beneficial to have one RAR message giving rise to several Msg3 such as, for example, in the case where there is uncertainty as to which is the best UL beam and, hence, several UL beams are used to increase the chance that the eNB receives the Msg3.

To facilitate the aforementioned many-to-one, many-to-many, or one-to-many mappings, it is important that the scheduler in the eNB 72 should not schedule Msg3 in the same subframe in which the scheduler may want to transmit a RAR message. For example, in the context of the RAR window 137 in FIG. 8, if the eNB 72 chooses to transmit RAR messages in subframe-18 through subframe-20, then an equation other than equation (2) may have to be used to derive subframes for Msg3 to be scheduled using DL subframe-10 through DL subframe-13, or, alternatively, the resolution of the delay indicator "d" may have to be increased to 2 bits, 3 bits, 4 bits, or any other suitable number of bits so that the equation (2) is satisfied and an appropriate UL subframe other than the subframe-20 is selected for Msg3.

It may be possible that some fixed DL subframes may be needed by the eNB's 72 scheduler for special purpose such as, for example, to transmit a DL synchronization (sync) signal or System Information (SI). The sync signal can be used by the UE 68 to detect and correct subframe and radio frame timing when communicating with the eNB 72. In one embodiment, the DL subframe to transmit a sync signal may be fixed in the carrier network 70. In that case, a conflict may arise if a formula, like equation (2), gives a subframe that cannot be used for Msg3 transmission because it is already reserved for a special purpose. An exemplary conflict resolution approach is discussed below.

FIG. 9 illustrates how an UL subframe for Msg3 may be scheduled when an initially-calculated subframe for Msg3 grant indicates a subframe that is reserved for a special purpose according to one embodiment of the present disclosure. The transmission of a sync signal mentioned in the previous paragraph is an example of such a "special purpose." The subframe sequence 150 in FIG. 9 is a slightly modified version of the sequence 135 in FIG. 8, but otherwise it is substantially similar to the sequence 135 in FIG. 8. Therefore, the common discussion applicable to FIGS. 8-9 is not repeated here for the sake of brevity. Similarly, for the sake of ease of discussion, the same reference numerals are used in FIGS. 8-9 to refer to the common elements, features, or functionality.

In the embodiment of FIG. 9, the equation (2) is still used to determine the UL subframe for Msg3, but, the delay indicator "d" has 2 bits instead of the 1-bit version in the embodiment of FIG. 8. Thus, four different values may be possible for "d", or d={0,1,2,3}. In binary representation, d={00, 01, 10, 11}. With $d_0$=5 and $N_{res}$=5, the equation (2) may determine the following "candidate" UL (Msg3) subframes for DL subframe-10, depending on the value of "d": subframe-15 when d=0, subframe-20 when d=1, subframe-25 when d=2, and subframe-30 when d=3. With $d_0$=5 and $N_{res}$=5, the equation (2) may determine the following "candidate" UL (Msg3) subframes for DL subframes 11 through 13, depending on the value of "d": subframe-20 when d=0, subframe-25 when d=1, subframe-30 when d=2, and subframe-35 (not shown) when d=3. The subframe-25 is identified by reference numeral "152" and the subframe-30 is identified by reference numeral "153." In particular embodiments, different values of "d" may be used in different RAR messages to accomplish the many-to-many or many-to-one mapping in a manner similar to that discussed earlier with reference to FIG. 8, albeit with only a 2-bit delay indicator as compared to the 4-bit version in the embodiment of FIG. 6.

As shown by way of an example in FIG. 9, the subframe-25 may be a DL subframe reserved for a special purpose. Hence, a conflict may arise when a formula, like equation (2), gives a subframe that cannot be used for UL Msg3 transmission because it is already reserved for a special transmission.

In one embodiment, the scheduler in the eNB 72 may use a rule that provides that such a conflict may be resolved by selecting a neighbor subframe of the initially-calculated subframe. The neighbor subframe may be the subframe that occurs before or after the conflicting subframe. Thus, based on the results of equation (2) for different values of "d," if the scheduler in the eNB 72 were to select the candidate subframe-25 for Msg3 grant, then, in the embodiment of FIG. 9, the scheduler may be configured to choose the subframe-24 instead for UL grant (Msg3). The subframe-24 precedes the conflicting subframe-25, and is identified by reference numeral "154." In another embodiment, the succeeding subframe-26 may be selected instead. Thus, more generally, the conflict resolution rule may specify automatic re-scheduling such that, in the event of a reserved subframe being indicated (by a formula/equation) for UL grant, the scheduler may use the preceding or succeeding available subframe. The "revised" subframe may be directly specified in the UL grant, such as the UL grant 99 in FIG. 5, in the corresponding RAR message (Msg2). In that case, the value in the delay indicator field, such as the field 100 in FIG. 5, may be ignored by the UE 68. On the other hand, in another embodiment, instead of directly specifying the "revised" subframe, the scheduler in the eNB 72 may instead re-configure the RAR message-specific time-delay indicator with a different value of "d" so that the delay indicator now refers to another radio subframe that occurs before (or after) the reserved subframe. Such "replacement" subframe may not necessarily be an immediate neighbor of the reserved subframe like in the embodiment of FIG. 9. The eNB 72 may then transmit the re-configured RAR message—containing the revised value of "d"—to the UE 68. For example, if the scheduler in the eNB 72 is configured to implement a many-to-one mapping using different values of "d" (depending on $n_{grant}$) in equation (2) above—for example, d=2 for $n_{grant}$=10 and d=1 for $n_{grant}$>10 (subframes 11 through 13), then the scheduler may initially prepare the RAR message for subframe-10 with d=2 and then learn of the conflict arising from this value of d=2. As a result, before transmitting this RAR message in subframe-10, the scheduler may adaptively re-configure the RAR message with any of the other values of "d" and then transmit the re-configured message in subframe-10. The scheduler may perform a similar re-configuration for each of the other subframes 11 through 13 for the desired many-to-one mapping. It is understood that, when there is no conflict, the scheduler may not need to carry out such adaptive re-configuration of RAR messages and, hence, the scheduler may continue to use the selected values of "d" depending on "$n_{grant}$."

In another embodiment, the above-described re-configuration may not be performed by the scheduler in the eNB 72. The scheduler may not check whether there is any conflict or not, and may not modify any pre-established value of "d". Rather, the UE 68 may be configured, for example, through a pre-defined or pre-signaled rule from the eNB 72, with information about determining reserved subframes. In that case, when the UE 68 computes the subframe for its Msg3 using the value of "d" received from the eNB 72, the UE 68 may detect the conflict and, as a result, the UE 68 may do the "re-configuration" by selecting a different UL subframe for Msg3 to avoid the conflict with the reserved subframe.

Figure 10:
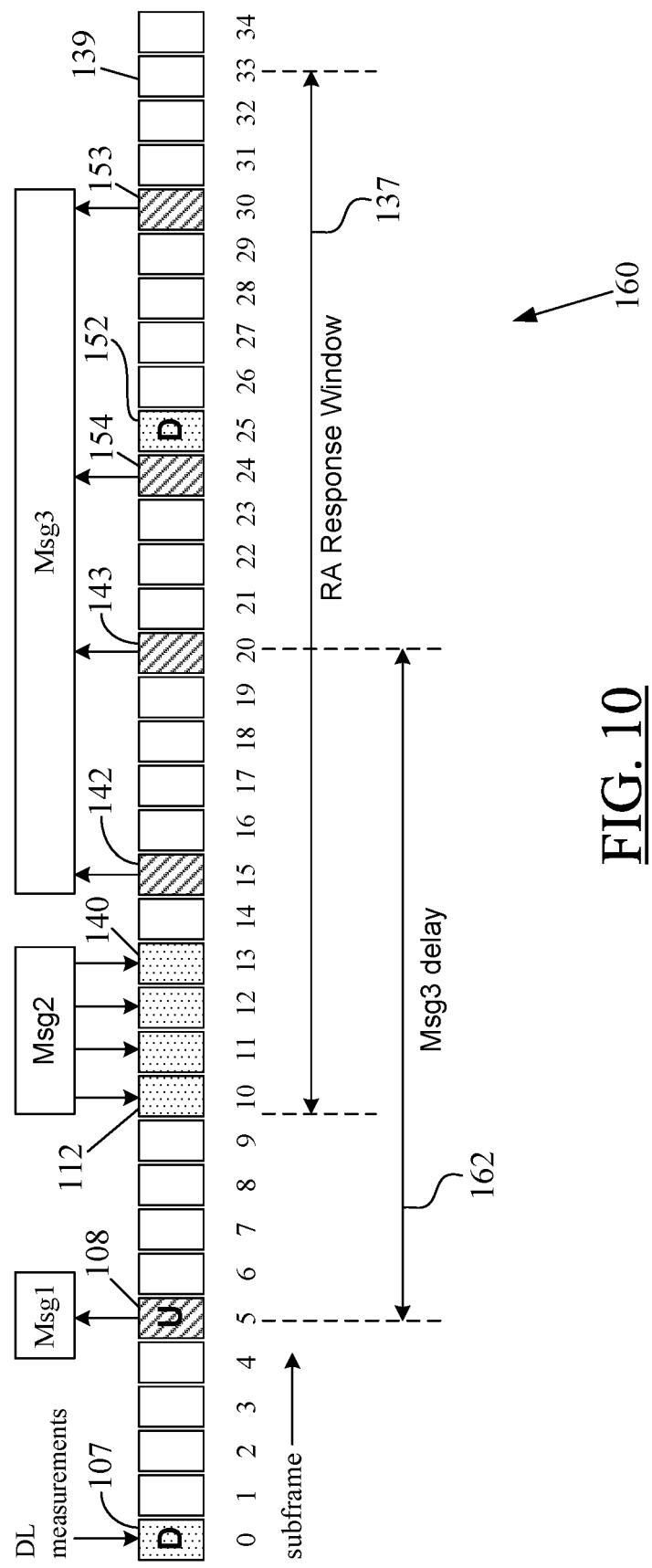
FIG. 10 is an exemplary illustration of Msg3 delay being specified relative to Msg1 according to one embodiment of the present disclosure.

FIG. 10 is an exemplary illustration of Msg3 delay being specified relative to Msg1 according to one embodiment of the present disclosure. The subframe sequence 160 in FIG. 10 is a slightly modified version of the sequence 150 in FIG. 9, but otherwise it is substantially similar to the sequence 150 in FIG. 9. Therefore, the common discussion applicable to FIGS. 9-10 is not repeated here for the sake of brevity. Similarly, for the sake of ease of discussion, the same reference numerals are used in FIGS. 9-10 to refer to the common elements, features, or functionality. In the embodiment of FIG. 10, the UL delay grant in each RAR message in subframe-10 through subframe-13 is specified in relation to the UE's Msg1 in subframe-5, instead of in relation to the subframe that contains the corresponding RAR message (Msg2) as in case of the embodiments in FIGS. 6, 8, and 9. In the embodiment of FIG. 10, all the Msg2 transmissions in subframes 10, 11, 12, and 13 may then contain the same delay grant, and may also indicate the same subframe number—here, the subframe-20—for Msg3, as illustrated by the arrow 162. In one embodiment, this delay grant may be specified as a binary value, which the UE 68 may use as a "counter" to determine the UL subframe 143 for Msg3. For example, each RAR message in FIG. 10 may include the 4-bit binary value "1111" (d=15) as a delay indicator to instruct the UE 68 to transmit its Msg3 in the 15$^{th}$ subframe after the Msg1 subframe-5. Hence, in the embodiment of FIG. 10, there may be no dependence on the subframe number of the subframe in which the Msg2 is transmitted.

One benefit of the Msg1-based scheduling is that all Msg2 transmissions can be identical or may have at least the same delay indicator field, such that the receiver UE 68 can combine the received signals (RAR messages) from several Msg2 subframes in a UE-based detector (not shown) for Msg2. The UE 68 may then use, for example, coherent, non-coherent, or soft-value combining in the Msg2 detector. In one embodiment, a message other than Msg1 may be selected as a "reference" in relation to which the UL delay grant for Msg3 may be specified by the eNB 72.

It is noted here that the parameter "$n_{grant}$" in equations (1) and (2) above is used to refer to a DL subframe carrying a RAR message. However, just for the sake of illustration, if the parameter "$n_{grant}$" is used to refer to the UL subframe 108 carrying Msg1, then $n_{grant}$=5. Furthermore, in case of $n_{grant}$=5, the previous value of $d_0$=5 may have to be modified to avoid conflict with Msg2-containing DL subframes. Hence, in the embodiment of FIG. 10, $d_0$=10. These new values of $n_{grant}$=5 and $d_0$=10 may be used in equation (2) above to arrive at the subframes having reference numerals 142, 143, 154 (to avoid conflict with the subframe-25), and 153 in FIG. 10 for four different values of d=00, 01, 02, and 03, respectively. In one embodiment, if the equation (2) is used to arrive at the subframe for UL Msg3, the UE 68 may be configured to use these new values of "$n_{grant}$" and "$d_0$" to perform the calculations with relation to the subframe 108 of Msg1. It is observed that, in this embodiment, the delay indicator requires only 2 bits, as compared to the 4-bit based delay indicator (d=1111) discussed earlier.

It is observed from the discussion of FIGS. 6-10 that multiple RAR transmissions according to particular embodiments of the present disclosure increase the probability that at least one RAR message is received by the UE 68 when the eNB 72 employs narrow beamforming. On the other hand, for example, the earlier-mentioned 3GPP TS 36.213 and other relevant cellular standards specify a one-to-one mapping between a RAR message in the DL and its corresponding Msg3 in the UL. Such one-to-one mapping may not solve the problem of a UE's non-receipt of the single RAR message, especially when analog beamforming is employed by the eNB. Therefore, particular embodiments of the present disclosure provide the eNB with the flexibility to choose any of the following mappings: the traditional one-to-one mapping, the earlier-discussed one-to-many mapping, the many-to-one mapping as discussed earlier with reference to the exemplary embodiments in FIGS. 6 and 8-10, or the many-to-many mapping as also discussed earlier with reference to the exemplary embodiments in FIGS. 8-10. In particular embodiments, these choices are possible because of the inclusion of a scheduling-delay indicator in the UL grant carried by a RAR message. The delay indicator may be of any bit-length. In one embodiment, the delay indicator may be of variable bit length. For example, the number of bits in delay-indicator fields in two RAR messages from the same eNB may differ depending on, for example, the beams in which these RAR messages are transmitted, or the UEs to which these RAR messages are addressed. Other configurations of delay indicator-containing RAR messages also may be devised based on the teachings of the present disclosure.

Figure 11:
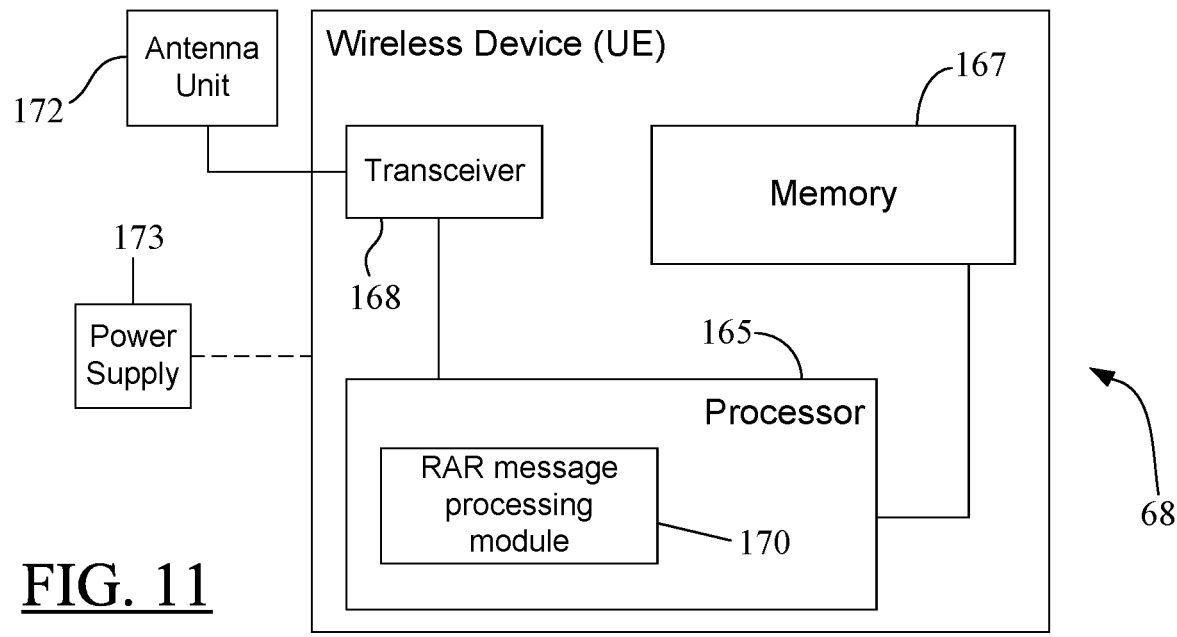
FIG. 11 shows a block diagram of an exemplary wireless device according to one embodiment of the present disclosure.

FIG. 11 shows a block diagram of an exemplary wireless device, such as the wireless device 68, according to one embodiment of the present disclosure. As noted earlier, the mobile or wireless device 68 may be a UE, an Access Terminal (AT), or any other wireless device operating in a carrier network such as, for example, the network 70 in FIG. 3. The wireless device 68 may include a processor 165, a memory 167, and a transceiver 168. In some embodiments, the memory 167 may also include memory on the UE's Subscriber Identity Module (SIM) card. The processor 165 may include a RAR Message-Processing Module 170, which may include program code for processing the time delay indicator-containing RAR messages received from a network entity, such as the eNB 72 in the network 70, as per the teachings of the present disclosure. Upon execution of the program code of the module 170 by the processor 165, the processor may configure the wireless device 68 to perform various RAR-message processing tasks discussed hereinbefore with reference to FIG. 4B and those tasks that are needed to be performed by the UE 68 in the embodiments of FIGS. 6-10 to generate and send one or more UL responses (Msg3). Such tasks include, for example, storing a pre-defined formula or equation, receiving a RAR message with a delay indicator, using the stored equation or some other means to determine the time-delay value for Msg3 based on the delay indicator, generating at least one Msg3, transmitting the Msg3 corresponding to the received RAR message, and so on.

The memory 167 may store, for example, the received RAR messages, each UE-generated Msg3 prior to its transmission in the UL by the transceiver 168, and other user-data content. The transceiver 168 may communicate with the processor 165 to perform transmission/reception of data, control, or other signaling information—via an antenna unit 172—to/from the network entity with which the wireless device 68 may be in communication. For example, in one embodiment, the processor 165 may retrieve a Msg3 stored in the memory 167 and provide it to the transceiver 168 to be sent to the network entity in response to a RAR message from the network entity detected by the UE 68. The transceiver 168 may be a single unit or may comprise of two separate units—a transmitter (not shown) and a receiver (not shown). The antenna unit 172 may include one or more antennas and, in some embodiments, may enable the UE 68 to operate in a Carrier Aggregation (CA) environment. The antenna unit 172 may receive the analog beamformed signals from the eNB 72 and provide them to the transceiver 168 for further processing by the processor 165. Furthermore, multiple antennas in the antenna unit 172 may allow the UE 68 to receive different DL beams simultaneously—such as those sent by a single eNB or multiple base stations. Alternative embodiments of the wireless device 68 may include additional components responsible for providing additional functionality, including any of the functionality identified herein, such as, for example, attaching to its source cell 72, preparing and sending a random-access preamble to the source cell as part of the Msg1 from the UE 68, carrying out various other tasks associated with a random-access procedure similar to that illustrated in FIG. 2, receiving and processing analog beamformed signals transmitted by the source eNB 72, receiving and responding to RAR message(s) as discussed before with reference to FIGS. 6-10, and so on, and/or any functionality necessary to support the solution as per the teachings of the present disclosure. In one embodiment, the wireless device 68 may be a multi-mode device capable of operating in LTE and non-LTE networks. In another embodiment, the wireless device 68 may include an on-board power supply unit 173 such as, for example, a battery or other source of power, to allow the device to be operable in a mobile manner.

In one embodiment, the wireless device 68 may be configured—in hardware, via software, or both—to implement device-specific aspects of RAR message-processing and Msg3 transmission as per teachings of the present disclosure. The software or program code may be part of the module 170 and may be stored in the memory 167 and executable by the processor 165. For example, when existing hardware architecture of the device 68 cannot be modified, the functionality desired of the device 68 may be obtained through suitable programming of the processor 165 using the module 170, with or without additional storage provided by the memory 167. The execution of the program code, by the processor 165, may cause the device 68 to perform as needed to support the time-delay indicator-based RAR messaging solution as per the teachings of the present disclosure. Thus, although the wireless device 68 may be referred to as "performing," "accomplishing," or "carrying out" (or similar such other terms) a function or a process or a method step, such performance may be technically accomplished in hardware and/or software as desired. The network operator or a third party, such as, for example, a manufacturer or supplier of the device 68, may suitably configure the device 68, for example, through hardware and/or software-based configuration of the processor 165, to operate and reciprocate with the network entity, such as the eNB 72 in FIG. 3, as per the particular requirements of the present disclosure discussed above.

Figure 12:
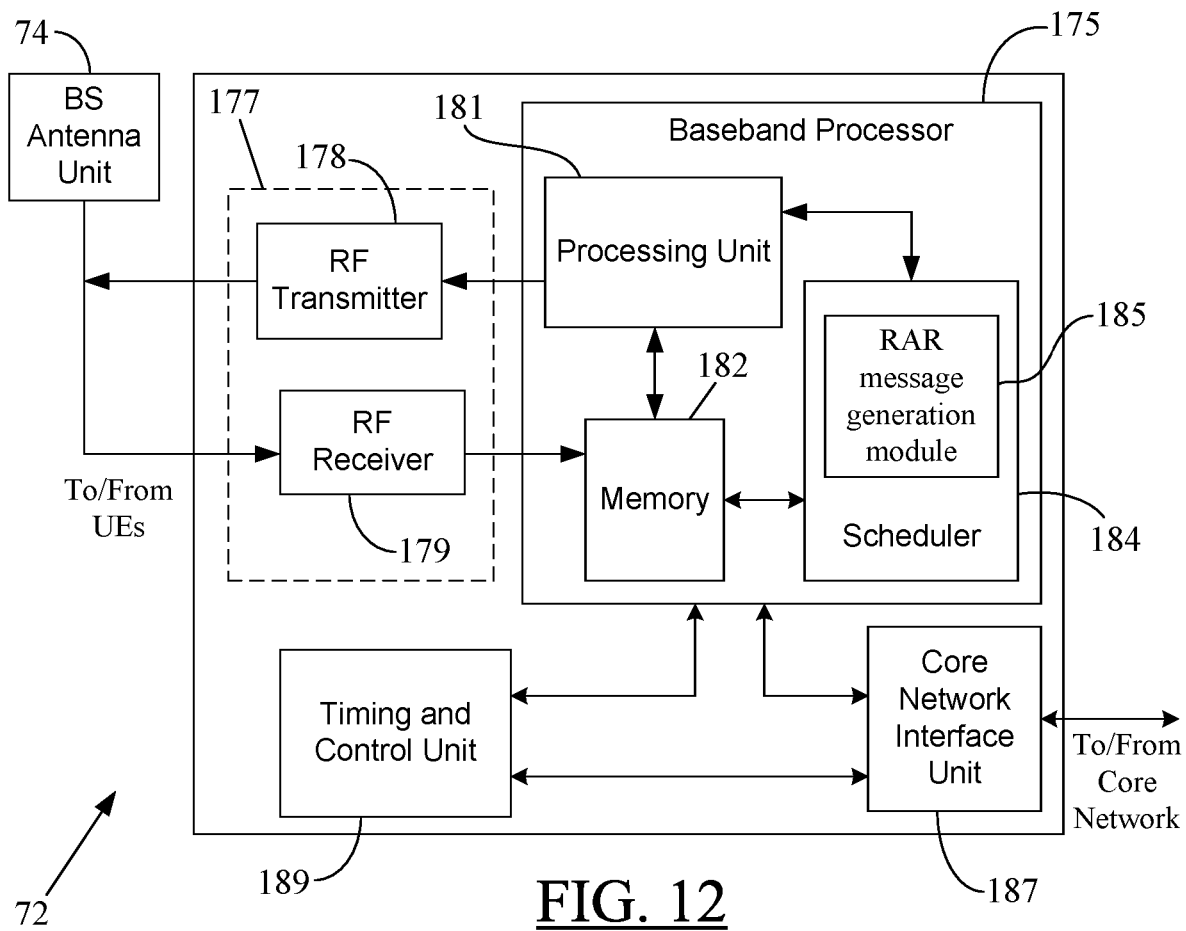
FIG. 12 depicts an exemplary block diagram of a base station that may function as a network entity according to one embodiment of the present disclosure.

FIG. 12 depicts an exemplary block diagram of a base station, such as the eNB 72 in FIG. 3, which may function as a network entity according to one embodiment of the present disclosure. In one embodiment, the base station 72 may be configured to perform various functionalities of the network entity discussed earlier with reference to FIGS. 4A and 6-10. Thus, for example, the base station 72 may be configured to perform analog beamforming, generate and successively transmit multiple RAR messages—each having the format similar to the RAR message 97 in FIG. 5—to the UE 68, supply or configure the UE 68 with necessary formula or equation or other information to enable the UE to calculate the UL subframe number for UE's Msg3 response, analyze responses/messages received from the UE 68 to determine the preferable UL and DL beams for the UE 68, and so on. The base station 72 may or may not use a secondary entity such as, for example, a pico base station or an access point, to perform some or all of such tasks.

The base station 72 may include a baseband processor 175 to provide radio interface with the wireless device 68 via base station's Radio Frequency (RF) transceiver unit 177 coupled to the base station's antenna unit 74, which is also shown in FIG. 3 and also referred to as "antenna array." The antenna unit 74 may include one or more antennas (not shown) forming an antenna array, and, in certain embodiments, the base station 72 may support Carrier Aggregation. The transceiver unit 177 may include RF transmitter 178 and RF receiver 179 units coupled to the antenna unit 74 as shown. In one embodiment, the processor 175 may receive transmissions from the wireless device 68 via the combination of the antenna unit 74 and the receiver 179. Such transmissions may include, for example, uplink and/or downlink channel condition related information, messages—like Msg1 and Msg3—generated as part of a random-access procedure, geographical location information, requests for multimedia content, user data, and the like. The base station's transmissions to the wireless device 68 may be carried out via the combination of the antenna unit 74 and the transmitter 178. Such BS-originated transmissions include, for example, timing and synchronization signals, System Information (SI), RAR messages having a format similar to the RAR message 97 in FIG. 5, streaming of user-requested multimedia content, a query for a mobile device's geographical location information, scheduling-related messages, and the like.

The processor 175 may be configured (in hardware and/or software) to perform various actions mentioned above as well as discussed with reference to FIGS. 4A and 6-10 as being performed by the eNB 72. In that regard, the processor 175 may include a processing unit 181 coupled to a memory 182 and a scheduler 184 to enable the processor 175 to perform such actions discussed in detail hereinbefore. In one embodiment, the memory 182 may be a separate unit—that is, not an internal part of the processor 175 as in FIG. 12—but coupled to the processor 175 to provide requisite storage. In another embodiment, the memory 182 may function as a storage of Msg1, Msg3, and other content such as, for example, a channel condition Measurement Report, received from the UE 68. The memory 182 may also contain program code that, upon execution by the processing unit 181 and/or the scheduler 184, may configure the eNB 72 to perform generation and transmission of RAR messages as discussed hereinbefore with reference to FIGS. 6-10.

The scheduler 184 may provide the UL and DL scheduling decisions for the wireless device 68 based on a number of factors such as, for example, Quality-of-Service (QoS) parameters, device buffer status, UL and DL channel condition related information received from device, device capabilities, and the like. In one embodiment, the UL and DL scheduling decisions may be part of a random-access procedure, like the procedure shown in FIG. 2. In one embodiment, the network entity 72 may include separate UL and DL schedulers (not shown in FIG. 12) as part of its baseband processor 175. The scheduler 184 may have the same data structure as a typical scheduler in an eNB in an LTE system.

In the embodiment of FIG. 12, the scheduler 184 is shown to include a RAR Message Generation Module 185 that may contain a portion of the program code stored in the memory 182, or may retrieve the relevant program code from the memory 182 during run time, or may contain all of the program code needed to enable the scheduler 184 to perform generation and transmission of RAR messages as per teachings of the present disclosure. In one embodiment, the program code in the module 185, when executed in conjunction with the program code in the memory 182 or independently of the program content in the memory 182, may configure the eNB 72 to perform the RAR-message generation and transmission according to particular embodiments of the present disclosure. For example, through the module 185, the scheduler 184—with or without additional processing help from the processing unit 181—may execute appropriate program code to schedule UE's 68 transmissions in the UL and the DL, send a formula/equation or other appropriate information to the UE 68 to enable to UE 68 to carry out the random-access procedure, receive and process the Msg1 sent by the UE 68, determine the best (or preferable) UL/DL beam(s) for the UE 68, generate and transmit multiple RAR messages as per teachings of the present disclosure to schedule the UE's UL transmission(s) (or Msg3), assist the processing unit 181 in UL/DL analog beamforming, and the like. More generally, various eNB-based actions discussed before with reference to the embodiments in FIGS. 4A and 6-10 may be performed by the scheduler 184, which may operate in conjunction with the processing unit 181 and the memory 182, as needed.

The processor 175 may also provide additional baseband signal processing as required. Such processing may include, for example, mobile/wireless device registration, channel information transmission, radio-resource management, and the like. The processing unit 181 may be in communication with the memory 182 to process and store relevant information for the corresponding cell site such as, for example, the identities of the UEs or wireless devices operating within the source cell, channel-condition reports received from wireless devices, user data received from or to be sent to the UEs operating within the source cell, and so on. The processing unit 181 may include, by way of example, a general-purpose processor, a special-purpose processor, a conventional processor, a digital signal processor (DSP), a plurality of microprocessors, one or more microprocessors in association with a DSP core, a controller, a microcontroller, Application-Specific Integrated Circuits (ASICs), Field-Programmable Gate Arrays (FPGAs) circuits, any other type of integrated circuit (IC), and/or a state machine. The processor 175 may employ distributed processing in certain embodiments.

As noted before, in particular embodiments, some or all of the functionalities described above and earlier with reference to FIGS. 4A and 6-10 as being provided by a network entity, such as a base station, a wireless access node/point, a base station controller, and/or any other type of mobile communications node, may be provided by the scheduler 184 executing instructions stored on a computer-readable data-storage medium, such as the memory 182 shown in FIG. 12.

The network entity 72 in the embodiment of FIG. 12 may further include a core network interface unit 187 and a timing and control unit 189. The control unit 189 may monitor operations of the processor 175 and the network interface unit 187, and may provide appropriate timing and control signals to these units. The interface unit 187 may provide a bi-directional interface for the base station 72 to communicate with its core network 78 or other network-based control entity to facilitate administrative and call/data-management functions for mobile subscribers operating in the corresponding cell site of the carrier network, such as the operator network 70 in FIG. 3.

Alternative embodiments of the base station 72 may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features and elements. Some or all aspects of the delay indicator-based RAR messaging methodology discussed herein may be implemented in a computer program, software, or firmware incorporated in a computer-readable storage medium, such as, for example, the module 185 and/or the memory 182 in FIG. 12, for execution by a general-purpose computer or a processor, such as, for example, the scheduler 184—with or without processing support from the processing unit 181—in FIG. 12. Examples of computer-readable storage media include a Read-Only Memory (ROM), a Random-Access Memory (RAM), a digital register, a cache memory, semiconductor memory devices, magnetic media such as internal hard disks, magnetic tapes and removable disks, magneto-optical media, and optical media such as CD-ROM disks and Digital Versatile Disks (DVDs). In certain embodiments, the memory 182 may employ distributed data storage with/without redundancy.

The foregoing describes a system and method of RAR-messaging when a base station employs narrow beamforming. To address the problem of potential mismatch between the DL and UL beam directions in an analog beamformed system, the present disclosure provides for successively transmitting multiple RAR messages (Msg2) from the base station to a UE during a random-access procedure. These RAR messages may be transmitted at different times and/or using different beams, but before any Msg3 response is received from the UE. As a result, despite any calibration mismatch between UL and DL beams, an RAR message is not only received by the UE, but is received over a DL beam that is most suitable (or good enough) for that UE. Each RAR message may contain a message-specific scheduling-delay indicator in the UL grant carried in the RAR message. The delay indicator provides an adjustable time delay for the UE's uplink transmission (Msg3) scheduled by the UL grant. In particular embodiments, multiple RAR transmissions (Msg2) at different time instances can schedule the same UL transmission (Msg3) for a single time instance, thereby resulting in a many Msg2-to-one Msg3 mapping. Alternatively, in other embodiments, at least two of the multiple successive RAR transmissions may schedule the UE's UL transmission at different time intervals, thereby resulting in a many-to-many correspondence between RAR messages and potential Msg3 transmissions from the UE. A one-to-many mapping may be implemented as well. The UE may report the measured best DL Msg2 in its Msg3. The RAR messaging according to the teachings of the present disclosure increases the overall robustness of the random-access procedure when narrow beamforming is used by the base station.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of processing a Random-Access Response (RAR) received by a User Equipment (UE) from a network entity, wherein the method comprises performing the following by the UE:

receiving one or more RAR messages from the network entity, wherein each RAR message includes a RAR message-specific time-delay indicator in a respective Uplink (UL) grant for the UE carried by the RAR message, wherein each RAR message-specific time-delay indicator specifies a UL time interval in which the UE is scheduled to transmit in the UL to the network entity;

detecting at least one of the one or more RAR messages; and sending a response to the detected at least one of the one or more RAR messages during the UL time interval specified by the selected at least one RAR message.

2. The method of claim 1, further comprising performing the following by the UE as part of sending the response:
processing the RAR message-specific time-delay indicator associated with the detected at least one RAR message to determine the UL time interval specified by the detected at least one RAR message in which the UE is scheduled to transmit to the network entity.

3. The method of claim 2, wherein processing the RAR message-specific time-delay indicator includes performing the following by the UE:
using the RAR message-specific time-delay indicator associated with the selected at least one RAR message in a pre-defined formula to determine the UL time interval specified by the selected at least one RAR message.

4. The method of claim 1, wherein detecting at least one of the one or more RAR messages includes performing one of the following by the UE:
from the received one or more RAR messages, detecting a RAR message having the largest received power;
from the received one or more RAR messages, detecting a successfully-received RAR message; and
from the received one or more RAR messages, detecting the at least one RAR message based on a pre-defined criterion.

5. The method of claim 1, wherein sending the response to the detected at least one of the one or more RAR messages includes performing one of the following by the UE when the UL time interval specified by the detected at least one RAR message happens to be a reserved subframe:
send the response using another radio subframe that occurs before the reserved subframe; and
send the response using another radio subframe that occurs after the reserved subframe.

* * * * *